United States Patent [19]

Shobatake et al.

[11] Patent Number: 5,557,609
[45] Date of Patent: Sep. 17, 1996

[54] SWITCHING APPARATUS FOR ATM

[75] Inventors: Yasuro Shobatake, Kawasaki; Keiji Tsunoda; Yoshiaki Takabatake, both of Yokohama; Mikio Hashimoto, Ichikawa; Taketoshi Tujita; Junichi Takeda, both of Yokohama; Narito Kimura, Ichikawa, all of Japan

[73] Assignee: Kabushiki Kaisha Toshiba, Kawasaki, Japan

[21] Appl. No.: 351,098

[22] Filed: Nov. 30, 1994

[30] Foreign Application Priority Data

Dec. 1, 1993 [JP] Japan .................................. 5-301489
Jun. 24, 1994 [JP] Japan .................................. 6-143568
Sep. 16, 1994 [JP] Japan .................................. 6-246806

[51] Int. Cl.$^6$ .............................................. H04L 12/66
[52] U.S. Cl. ...................... 370/60.1; 370/94.2; 370/105.1
[58] Field of Search ........................ 370/60, 60.1, 94.1, 370/94.2, 105.1

[56] References Cited

U.S. PATENT DOCUMENTS

| 5,054,069 | 10/1991 | Maeno et al. . |
| 5,203,024 | 4/1993 | Yamao . |
| 5,204,883 | 4/1993 | Blanc . |
| 5,274,641 | 12/1993 | Shobatake et al. . |
| 5,420,859 | 5/1995 | Takase et al. ........................ 370/60.1 |
| 5,430,721 | 7/1995 | Dumas et al. ........................ 370/60.1 |

Primary Examiner—Melvin Marcelo
Attorney, Agent, or Firm—Finnegan, Henderson, Farabow, Garrett & Dunner, L.L.P.

[57] ABSTRACT

A switching apparatus includes an input port to which information data associated with an ATM cell is input, a memory for storing information data input via the input port, a processor for sequentially performing frame synchronization process for finding a frame and ATM cell synchronization process for checking a cell structure with respect to information data read out from the memory, and an output port for outputting information data processed by the processor.

22 Claims, 21 Drawing Sheets

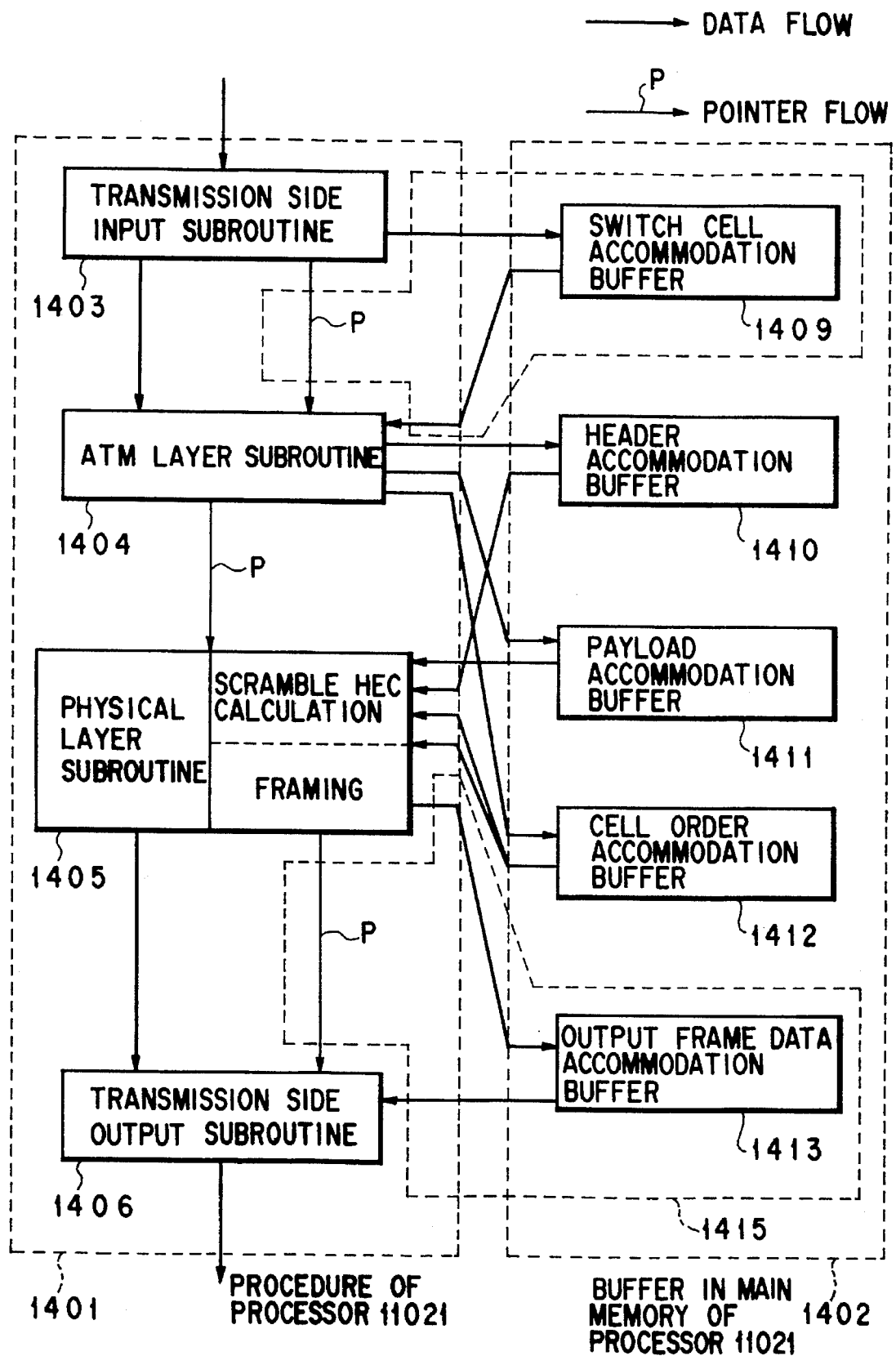
F I G. 14

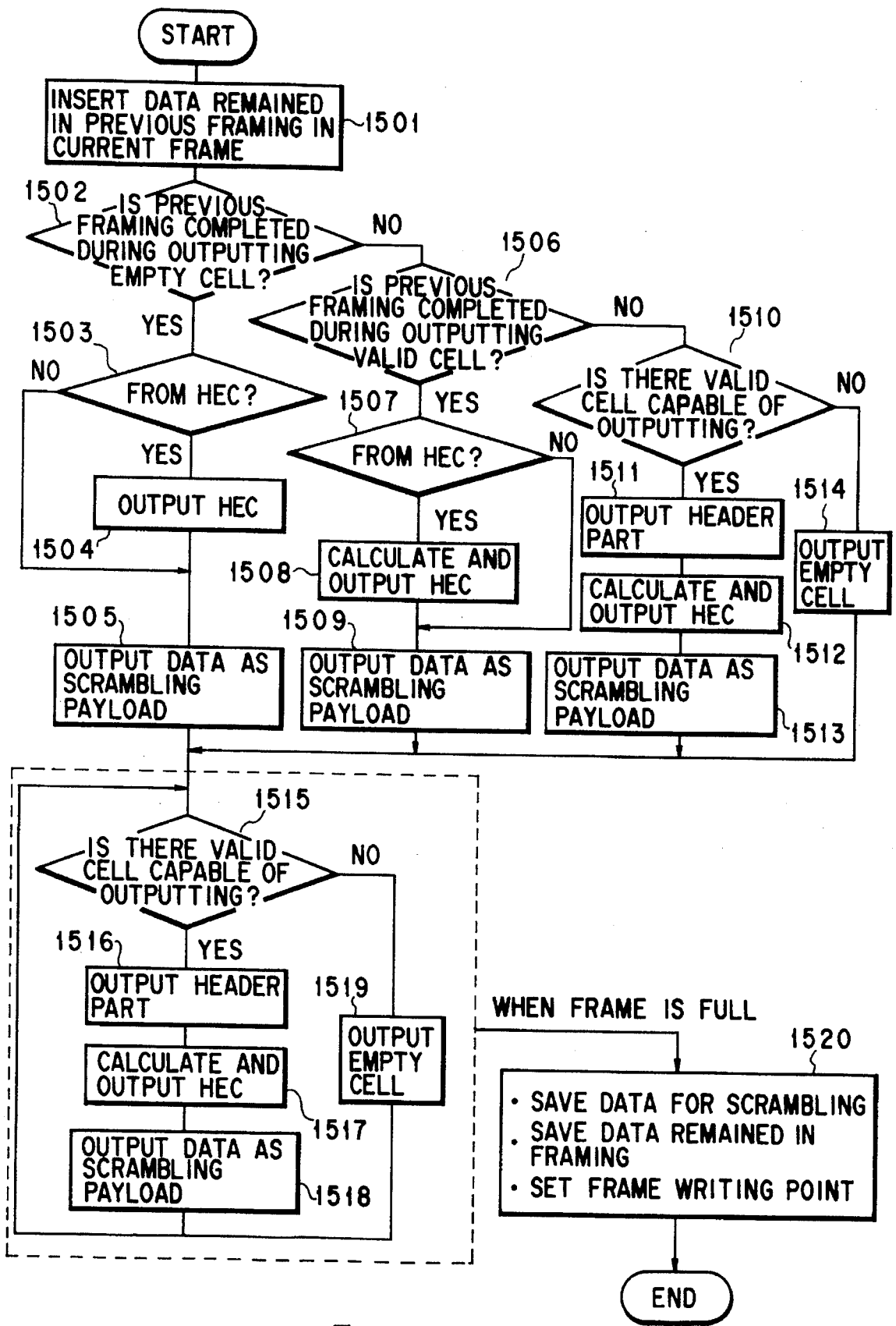
F I G. 15

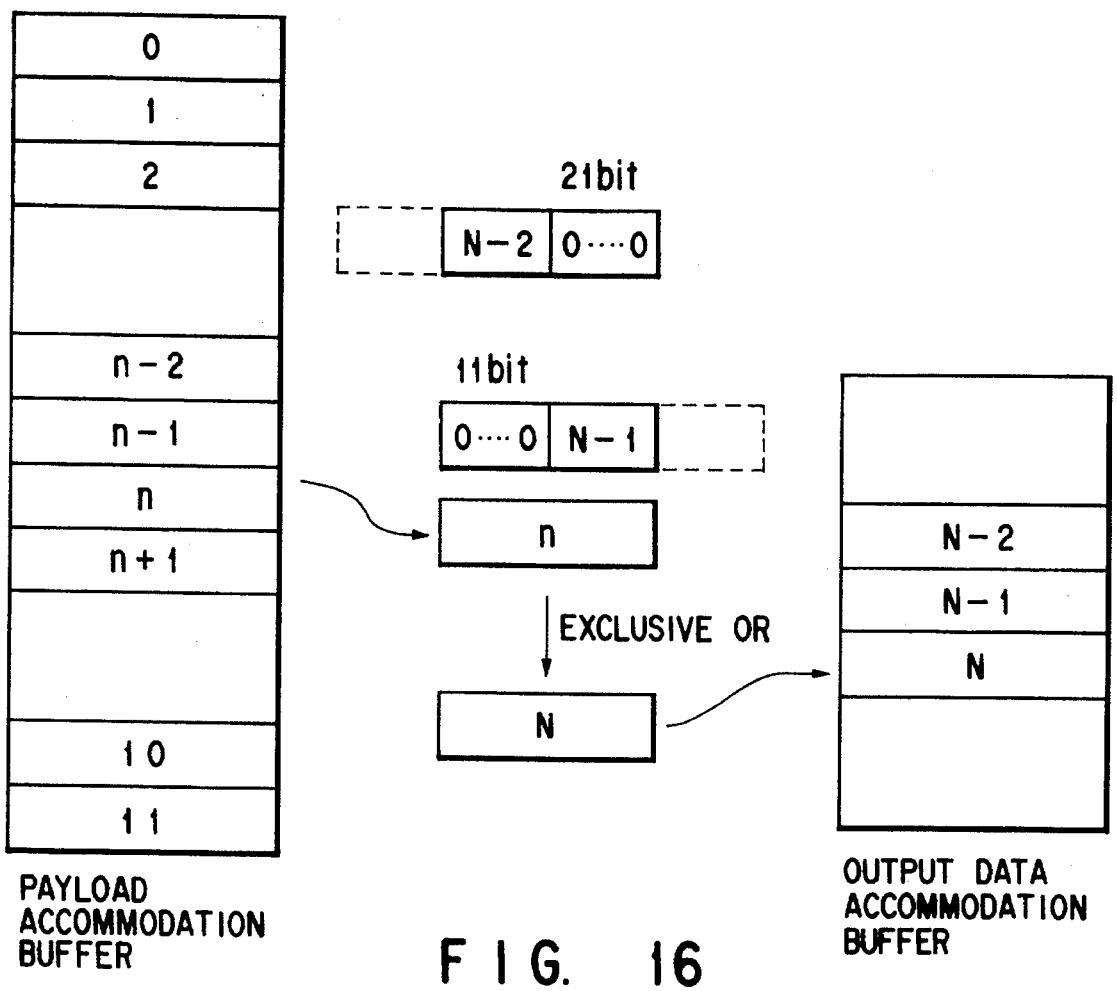
F I G. 16
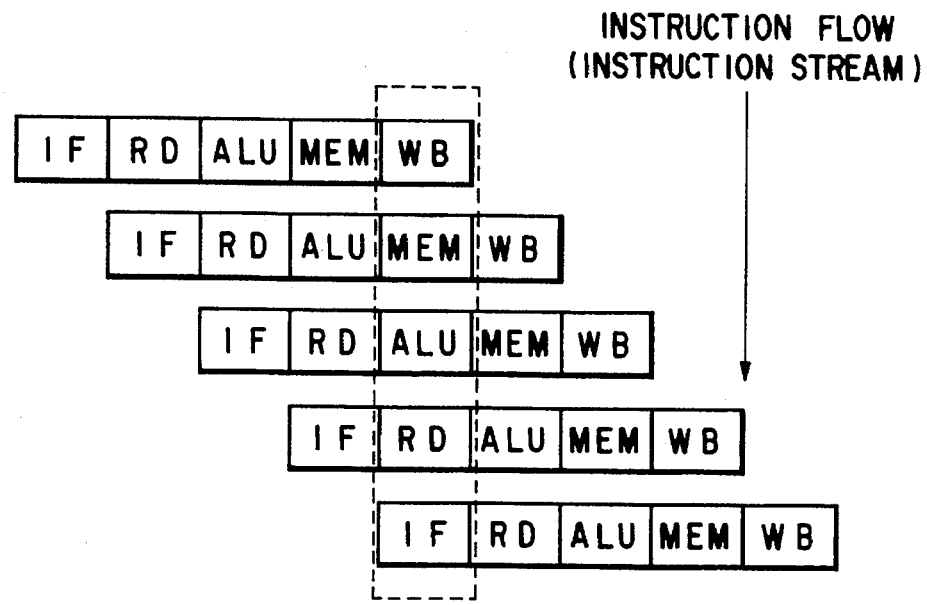
F I G. 18    INSTRUCTION PIPE LINE OF R 3000

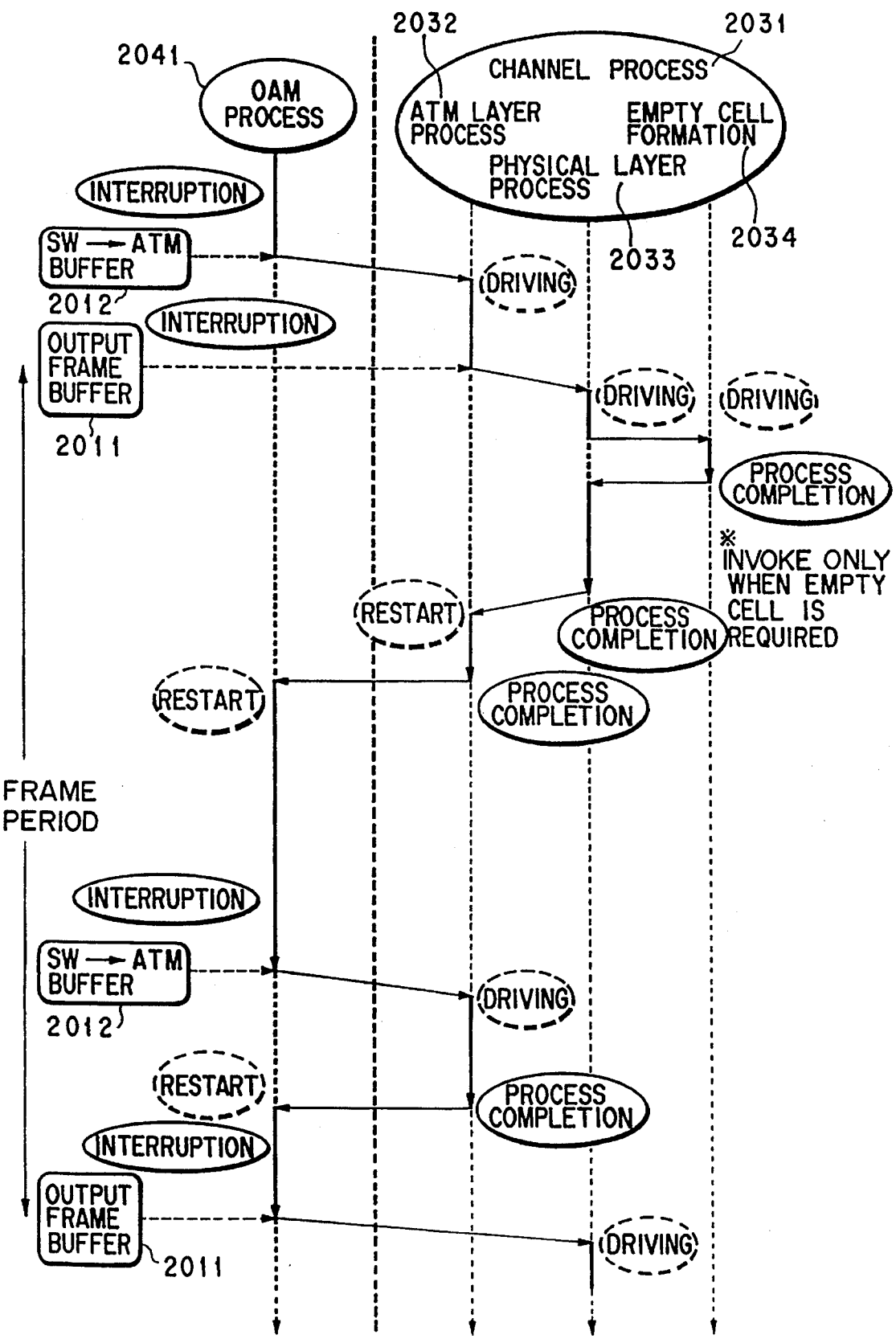
F I G. 22

| | RECEPTION SIDE (INVOKING CONDITION) | TRANSMISSION SIDE (DRIVING CONDITION) |
|---|---|---|
| 1 | EMPTY CELL FORMATION (ATM→SW BUFFER CELL FORMATION REQUEST) | PHYSICAL LAYER PROCESS + EMPTY CELL FORMATION (FRAME FORMATION REQUEST) |
| 2 | PHYSICAL LAYER PROCESS + ATM LAYER PROCESS (FRAME PROCESS REQUEST) | ATM LAYER PROCESS (SW→ATM BUFFER CELL PROCESS REQUEST) |
| 3 | OAM PROCESS (SLEEP OTHER PROCESS) | OAM PROCESS (SLEEP OTHER PROCESS) |

FIG. 23

| | PROCESS (INVOKING CONDITION) |
|---|---|
| 1 | TRANSMISSION SIDE PHYSICAL LAYER PROCESS + EMPTY CELL FORMATION (FRAME FORMATION REQUEST) |
| 2 | RECEPTION SIDE EMPTY CELL FORMATION (ATM→SW BUFFER CELL FORMATION REQUEST) |
| 3 | TRANSMISSION SIDE ATM LAYER PROCESS (SW→ATM BUFFER CELL PROCESS REQUEST) |
| 4 | RECEPTION SIDE PHYSICAL LAYER PROCESS + ATM LAYER PROCESS (FRAME PROCESS REQUEST) |
| 5 | OAM PROCESS (TRANSMISSION/RECEPTION) (SLEEP OTHER PROCESS) |

FIG. 24

SWITCHING APPARATUS FOR ATM

BACKGROUND OF THE INVENTION

1. Field of the Invention

The present invention relates to a switching apparatus and, more particularly, to a switching apparatus for transferring an ATM (Asynchronous Transfer Model) cell input from an input port at each interface point to an output port at a desired interface point in accordance with header information of the cell.

2. Description of the Related Art

A great deal of attention has been paid to an ATM technique as a technique aiming at a high-speed transmission/switching technique. An ATM is a technique aiming at implementation of hardware for packet switching by transferring a fixed-length short packet called a cell which carries all sorts of information, thereby facilitating transfer/switching of information at a high speed. In order to realize an ATM communication network for performing communication of information by using this scheme, it is essential to use a switching apparatus for transferring a cell from a given transmission line to a desired transmission line in accordance with the header information of the cell.

In conventional switching apparatuses, however, the following problems are posed. For example, in a conventional switching apparatus disclosed in U.S. Pat. No. 5,274,641 by one of the present inventors, dedicated hardware components for realizing the functions of physical and ATM layers are arranged along a data flow in a channel. The array of these dedicated hardware components connected in series perform physical and ATM layer function handling by a so-called pipeline scheme, in which each hardware component processes a data string received from the preceding hardware component. In a switching apparatus having such an arrangement, since the function of each layer is realized by a dedicated hardware component, the throughput is high. However, the dedicated hardware component on each layer increases the cost. Especially, an increase in cost is too high to apply the above system to a communication system currently attracting considerable attention as an ATM-LAN, which is designed to offer transmission ability based on ATM cells to terminals existing in a relatively closer area, or a so-called low-speed interface such as a 6.3-Mbps interface or a 20-Mbps interface which is used to accommodate low-end PCs in an ATM communication network and expected to be in great demand in the future.

In addition, a function realized by hardware lacks flexibility with respect changes in specifications. The ITU-T (International Telecommunication Unit) is enthusiastically promoting the standardization of the specifications of ATM communication networks. However, the standardization has not been completed yet. New specifications are proposed one after another.

If the function of each layer is realized by hardware in this state, hardware must be newly designed every time the specifications are changed or new specifications are proposed. As a result, a large amount of hardware must be designed, and the whole cost of the system is increased.

SUMMARY OF THE INVENTION

It is an object of the present invention to provide a low-cost switching apparatus.

It is another object of the present invention to provide a switching apparatus which can flexibly cope with changes in specifications and can quickly cope with new specifications.

According to the present invention, there is provided a switching apparatus for realizing processes executed by various functions included in the switching apparatus by an ALU and a sequencer by means of time-division multiplexing.

With this arrangement, the amount of hardware required for communication process functions can be reduced, thereby realizing a low-cost switching apparatus. In addition, by making the operation of the sequencer programmable, the apparatus can flexibly cope with changes in specifications and new specifications.

In a conventional switching apparatus, in executing a physical layer function handling or an ATM layer function handling, bit strings in a channel are supplied to a pipeline without interruption, and the bit lines are transferred in the pipeline without interruption. In contrast to this, in the switching apparatus of the present invention, in order to realize processes executed therein by time-division multiplexing, a bit string in a channel is temporarily held in a storage means arranged outside the sequencer, and the sequencer sequentially performs layer function handling of this bit string as a unit by using the ALU. In this method, when a predetermined amount of bit strings in a channel is held in the storage means arranged outside the sequencer, each layer function handling routine may be started.

An inexpensive microprocessor is preferably used in place of the ALU and the sequencer. The process speed of the switching apparatus of the present invention can be greatly increased by using pointers for the storage means in transferring user information between the respective layer functions which are subjected to time-division multiplexing in the sequencer.

In addition, not only the function of the channel required for each layer but also an OAM process of monitoring whether the channel function operates normally can be realized by the ALU and the sequencer by means of time-division multiplexing.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 14 is a block diagram for explaining segmentation of transmission side channel process subroutines;

FIG. 15 is a flow chart showing a transmission side channel physical layer function handling;

FIG. 16 is a flow chart showing data descramble process;

FIG. 18 is a chart for explaining the arrangement of an instruction pipeline;

FIG. 22 is a chart showing the processing timing on the transmission side of the switching apparatus in FIG. 17;

FIG. 23 is a table for explaining assignment of priorities to the respective processes;

FIG. 24 is a table for explaining assignment of priorities to the respective processes.

DETAILED DESCRIPTION OF THE PREFERRED EMBODIMENTS

The first embodiment of the present invention will be described below with reference to FIG. 1.

Figure 1:
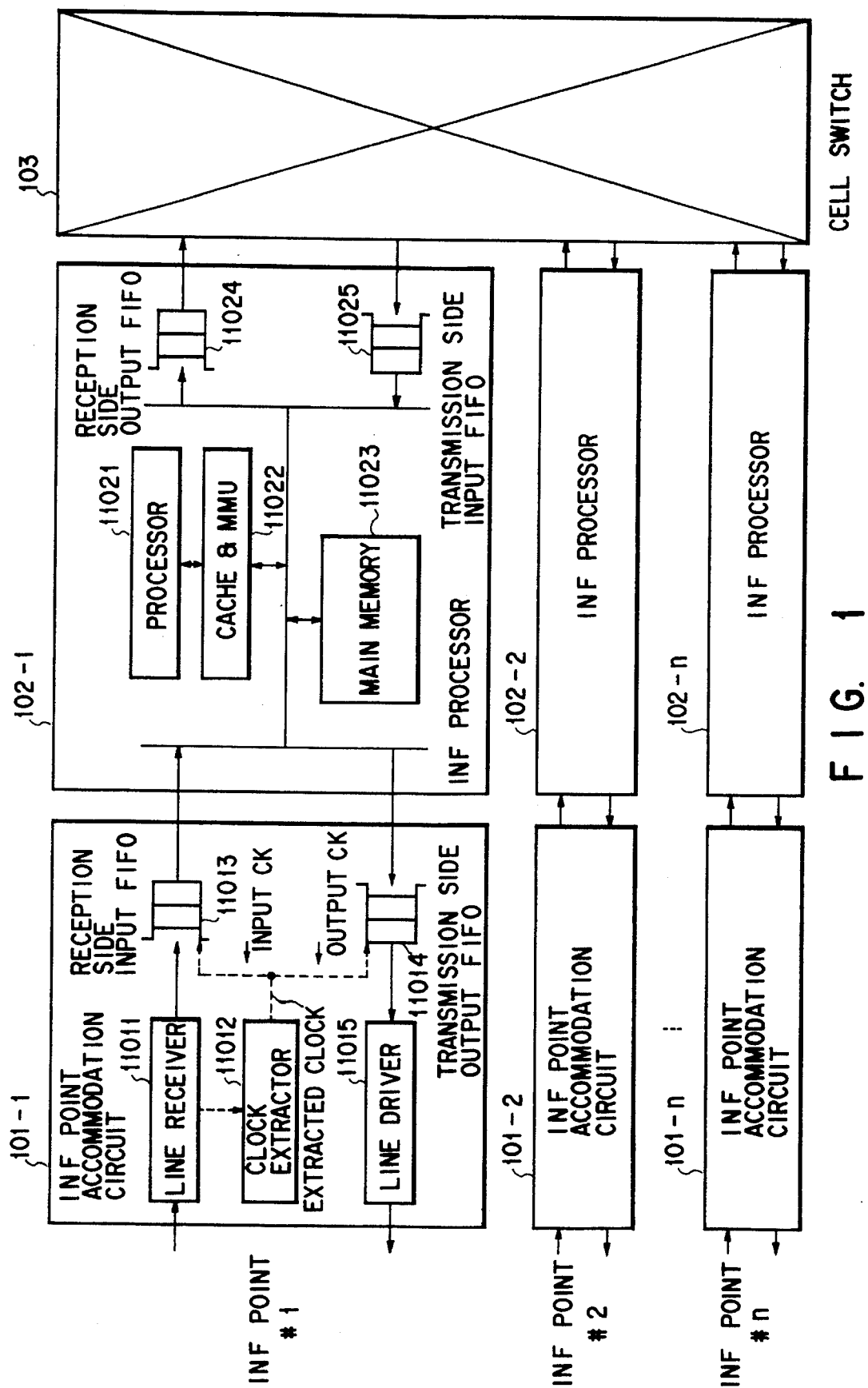
FIG. 1 is a block diagram showing the arrangement of a switching apparatus according to an embodiment of the present invention.

According to the switching apparatus shown in FIG. 1, interface (INF) processors 102-1 to 102-n for performing physical layer function handling as well as cell header processing are respectively connected to the ports of a hardware cell switch 103. With this scheme, interface points, each having a relatively simple frame structure as the frame structure of a physical layer, can be received at a lower cost. In addition, since switching of cells is performed by a hardware cell switch, a switching apparatus with a high throughput can be provided.

According to the switching apparatus shown in FIG. 1, interface point accommodation circuits 101-1, ..., 101-n and interface processors 102-1, ..., 102-n, which correspond to interface points 1, ..., n, are arranged between the hardware cell switch 103 and interface points 100-1, ..., 100-n.

The interface point accommodation circuits 101-1, ..., 101-n respectively receive bit strings from the interface points 1,..., n and convert the signal level of the bit strings to a signal level which can be fetched by the interface processors 102-1, ..., 102-n. In addition, the interface point accommodation circuits 101-1, ..., 101-n receive bit strings from the interface processors 102-1, ..., 102-n and convert the bit strings into a signal level which can be transmitted to the interface points 1, ..., n. The interface processors 102-1, ..., 102-n respectively receive bit strings from the interface point accommodation circuits 101-1, ..., 101-n and convert the bit strings into cell strings which can be transmitted to the cell switch 103. The interface processors 102-1, ..., 102-n also convert cell strings received from the cell switch 103 into bit strings which can be transmitted to the interface point accommodation circuits 101-1, ..., 101-n.

Each of the interface point accommodation circuits 101-1, ..., 101-n comprises: a line receiver 11011 for receiving a bit string from a corresponding one of the interface points 100-1, ..., 100-n and performing process such as level conversion; a clock extractor 11012 for extracting a clock for sampling a bit string from an output from the line receiver 11011; a reception side input FIFO 11013 for sampling a bit string from the line receiver 11011 in accordance with a clock from the clock extractor 11012, temporarily holding the bit string, and outputting the bit string according to a FIFO (first-in first-out) manner; a transmission side output FIFO 11014 for temporarily holding a bit string sent from a corresponding one of the interface processors 102-1, ..., 102-n and outputting the bit string in response to a clock formed by the clock extractor 11012 according to the FIFO manner; and a line driver 11015 for performing process such as conversion of a bit string sent from the transmission side output FIFO 11014 into a level at the respective interface points.

Each of the interface processors 102-1, ..., 102-n respectively comprises: a processor 11021 for offering the processing ability of a corresponding one of the interface processors; a cache memory & MMU 11022 attached to the processor 11021; a main memory 11023 attached to the processor 11021; a reception side output FIFO 11024 for temporarily holding a cell string which is formed upon process performed by the processor 11021 and is to be transferred to the cell switch 103; and a reception side input FIFO 11025 for temporarily holding a cell string from the cell switch 103 until reference is made from the processor 11021. The processor 11021 includes an ALU and a sequencer used for channel-processing in the present invention, and further a channel processing procedure code executed by the processor 11021 is written in the main memory 11023.

The cell switch 103 switches cell streams sent from the interface processors 102-1, ..., 102-n in accordance with routing tags added to the cells in the cell streams.

In the above embodiment, assuming that the processor 11021 has a bit width of 32 bits.

The operation of the switching apparatus of the embodiment shown in FIG. 1 will be described in detail below.

A bit string input via a given interface point is converted into a level in the switching apparatus by the line receiver 11011. At the same time, a clock for sampling the bit string is extracted from the bit string by the clock extractor 11012.

The reception side input FIFO 11013 samples the output from the line receiver 11011 in accordance with the clock extracted by the clock extractor 11012, and temporarily holds the bit string to prepare for reference made from the processor 11021.

The reception side input FIFO 11013 serves as one input port for the processor 11021. The processor 11021 periodically refers to the reception side input FIFO 11013 to form cells from the bit string held in the reception side input FIFO 11013 while performing operations for frame synchronization and cell synchronization to be described below. First of all, the processor 11021 performs the following process for establishing frame synchronization with respect to the bit string input from the reception side input FIFO 11013.

The processor 11021 searches the input bit string for a bit pattern indicating the head of a frame. Upon finding the bit pattern indicating the head of the frame, the processor 11021 checks whether an identical bit pattern is present one frame ahead of the current frame. In the case that the bit pattern is not found, the head of a frame cannot be found. Therefore, the input bit string may be discarded in this case.

Assume that a bit pattern indicating the head of a frame is found in the input bit string, and it is determined that identical bit patterns sequentially appear at time intervals of the frame length. In this case, the processor 11021 performs an operation for searching for the head of a cell from the bit pattern, i.e., an operation of cell synchronization. This operation is performed according to the ITU-T standard I. 432. That is, the processor 11021 performs a predetermined calculation with respect to a consecutively input 4-byte bit string, and checks whether the calculation result coincides with the next one byte. If they coincide with each other, it is determined that the four bytes constitute the header portion of the cell, the above one byte is an HEC value, and the subsequent 48 bytes constitute the information portion of the cell. As a result of this operation, the header of each cell in the input bit string can be recognized so that process can be performed in units of cells. Similar to the case of frame synchronization, while cell synchronization is not established, input bit strings may be discarded.

When cell synchronization is established, the processor 11021 sequentially reproduces cells in the internal register. Thereafter, the processor 11021 refers to the VPI/VCI values of each cell in the internal register and a routing tag table set in the main memory 11023 to acquire an output port number indicating a destination, to which the cell is to be transferred, and new VPI/VCI values at the corresponding output port. The processor 11021 sends a routing tag, calculated from the output port number according to the architecture of the cell switch 103, to the reception side output FIFO 11024. The processor 11021 then sends new VPI/VCI values obtained from the routing tag table to the reception side output FIFO 11024. Subsequently, the processor 11021 sequentially sends the PTI/CLP/HEC/information portion of input cells. With this operation, cell streams subjected to switching process in the cell switch 103 are sequentially input to the reception side output FIFO 11024.

The cell switch 103 periodically refers to the reception side output FIFO 11024 to receive a cell if it is held in the reception side output FIFO 11024, and transfers the cell to a desired output port in accordance with the routing tag added to the cell. If no cell is held in the reception side output FIFO 11024 when the cell switch 103 refers to the reception side output FIFO 11024, the reception side output FIFO 11024 may output an empty cell.

Each cell having undergone switching by the cell switch 103 is transferred to the transmission side input FIFO 11025 to be temporarily held. If an empty cell is transferred from the cell switch 103, the transmission side input FIFO 11025 preferably holds the empty cell as well.

The processor 11021 periodically refers to the transmission side input FIFO 11025 to store a cell, held in that FIFO 11025, in the internal register. Thereafter, the processor 11021 removes the routing tag from the cell and calculates the HEC value of the cell and replace the old HEC value with the calculated HEC value.

Upon completion of the above operation, the processor 11021 outputs the cell to the transmission side output FIFO 11014. In this case, the processor 11021 inserts bit patterns, required for frame synchronization, in the cell at predetermined intervals. With this operation, bit strings to be output to the corresponding interface point are sequentially written in the transmission side output FIFO 11014.

A bit string held in synchronism with a clock extracted by the clock extractor 11012 is output from the output section of the transmission side output FIFO 11014. The bit string output from the transmission sided output FIFO 11014 is input to the line driver 11015 to be converted into a level at the corresponding interface point. The resultant bit signal is then output to the interface point.

According to this embodiment, with the functions of the reception side input FIFO 11013 and the transmission side output FIFO 11014, variations in the processing time taken for process performed by the processor 11021 can be absorbed, and information can be input/output from/to each interface at a predetermined speed.

In the above embodiment, in order to minimize the number of accesses to the main memory 11023, the cell from/to the interface point or the cell switch 103 is reproduced by the register in the processor 11021. If such procedures are taken, it is hard to manage the execution of the program. Therefore, the information from the interface point or the cell switch 103 may be once stored in the main memory 11023 in a number of information groups, and the requested process may be executed for each information group. By this method, the management of execution of the program become easier as described after.

Note that a communication network is constituted by a plurality of switching apparatuses connected to each other. In this case, network synchronization indicates that the frequencies of operation clocks for all the switching apparatuses constituting the communication network are accurately matched with the frequency of one oscillator. Unless network synchronization is established, frame synchronization and cell synchronization periodically step out, and the overall operation of the communication network becomes unstable.

In the switching apparatus shown in FIG. 1, since data is output from the transmission side output FIFO 11014 in response to a clock extracted from a bit string formed by a corresponding switching apparatus, output of the data to an interface point is performed in accordance with the frequency of an operation clock for the corresponding switching apparatus. In this case, the switching apparatus shown in FIG. 1 is not the master of network synchronization. In order to cope with a case wherein the switching apparatus serves as the master of network communication, the switching apparatus may have a function of outputting a bit string to an interface point in synchronism with a clock reproduced by the reception side input FIFO 11013, and also the transmission side output FIFO 11014 may have a function of outputting a bit string to an interface point in synchronism with a clock reproduced by the switching apparatus including the FIFO 11014. Furthermore, in this case, the switching apparatus may have a function of matching the frequency of the operation clock produced by itself with the frequency of a clock extracted by a predetermined one selected from among the clock extraction functions that the switching apparatus has. This function can be realized by a known method called PLL.

The procedure for transmitting received data in the switching apparatus of this embodiment will be briefly described next with reference to the flow chart shown in FIG. 2. This shows a method of once writing information from the interface point or a cell switch in a main memory 11023, and thereafter performing necessary processes sequentially.

Figure 2:
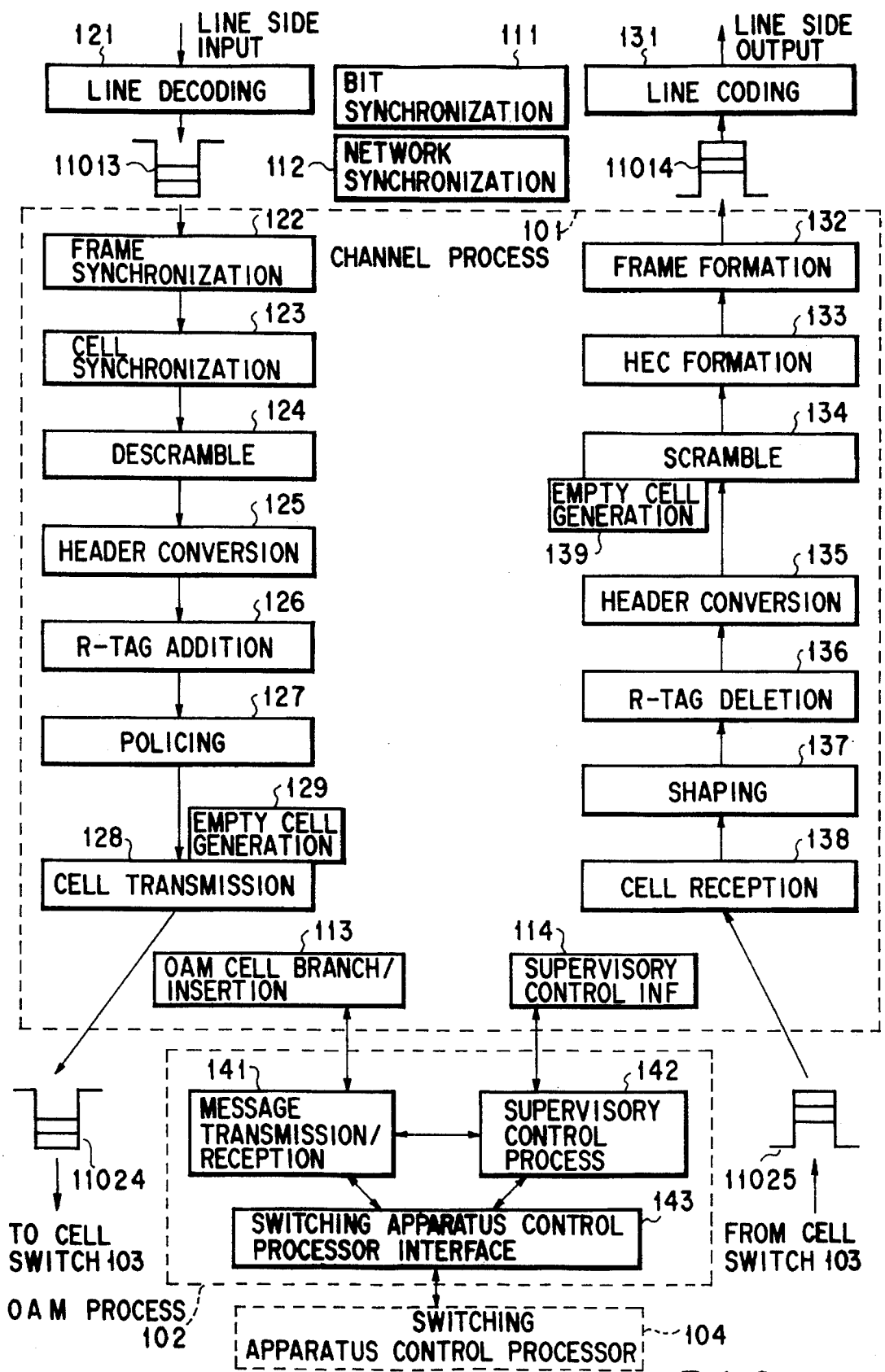
FIG. 2 is a functional block diagram showing the overall arrangement of the switching apparatus including a processor switching process package.

FIG. 2 is a functional block diagram showing the flows of process in each reception side interface section and each transmission side interface section in the switching apparatus of this embodiment.

The process executed by the switching apparatus of this embodiment is constituted by a channel process 101 and an OAM (Operation And Maintenance) process 102.

The channel process 101 is constituted by two processes, i.e., a reception side channel process of receiving data from a reception side line via a reception side input section, sequentially performing a physical layer function handling and an ATM layer function handling with respect to the data, and outputting the resultant data to the cell switch 103 via a reception side output section; and a transmission side channel process of receiving data from the cell switch 103 via a transmission side input section, sequentially performing an ATM layer function handling and a physical layer function handling with respect to the data, and outputting the resultant data to a transmission side line via a transmission side output section.

The reception side channel process will be briefly described below.

In the reception side input section, first the line decoding 121 is executed, and then a network clock is extracted from a received signal, and bit synchronization is established. The signal is converted into a data string as a bit expression and stored once in the reception side input FIFO 11013.

The above process is realized by hardware instead of software.

The bit string is read out from the reception side input FIFO 11013 and an ATM cell is extracted from this bit string upon a physical layer function handling including, e.g., frame synchronization 122, cell synchronization 123, and descramble process 124 for each cell payload section. Thereafter, an ATM layer function handling including header conversion 125, routing tag addition 126 for intra-switch routing, and flow rate monitoring (policing) 127 is performed, and the cell is output to the cell switch 103 via a reception side output FIFO 11024. In other words, the processes including the frame synchronization 122, cell synchronization 123, descramble process 124, header conversion 125, R-TAG addition 126 and policing 127 are executed by the processor 11021 in a time division multiplexing.

The transmission side channel process will be briefly described below.

On the transmission side, a cell having undergone switching by the cell switch 103 is transferred to the transmission side channel process via the transmission side input section. The cell data is subjected to an ATM layer function handling including shaping 137, routing tag deletion 136, and header conversion 135. In addition, the cell data is subjected to a physical layer function handling including scramble process 134 of a cell payload section, HEC (Header Error Control) field formation 133 for the cell header and frame formation 132, and transferred to the transmission side output FIFO 11014. Then, the data is subjected to line encoding 131, and the resultant bit data is output to the transmission side line. In this case, the line encoding 131 is executed by hardware. Also, the shaping 137, R-TAG deletion 136, header conversion 135, scramble 134, HEC formation 133 and frame formation 132 are executed by the processor 11021 in a time-division multiplexing.

Programs for performing these channel processes with respect to data obtained by mapping cells conforming to the ITU-TS recommendation I. 432 into a frame conforming to the TTC standard JT-G. 703-a in accordance with the ITU-TS recommendation G. 804 will be described in detail below with reference to the reception side channel process and the transmission side channel process, respectively. It is preferable that each program be written with a high-level language such as C.

Figure 3:
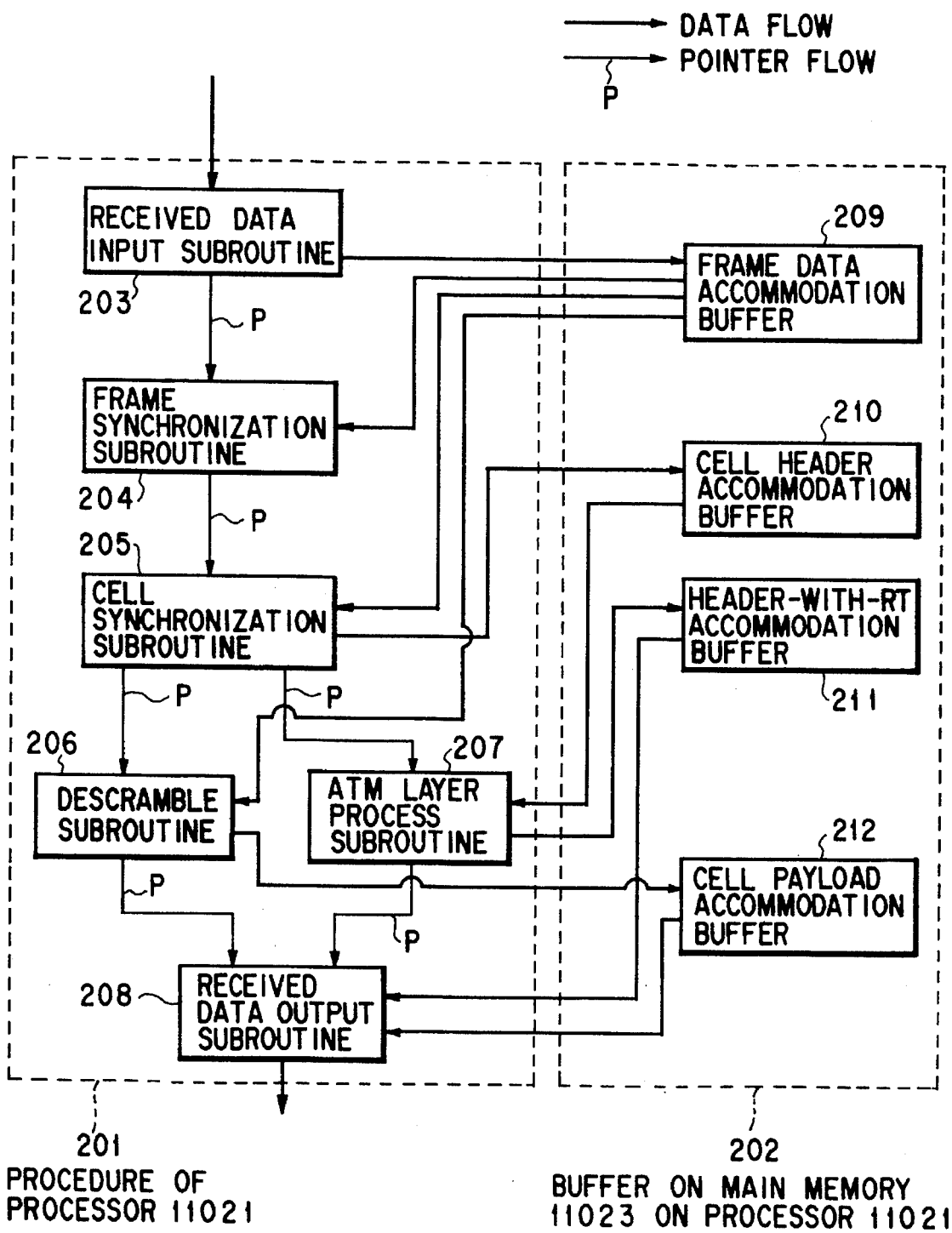
FIG. 3 is a block diagram showing the arrangement of an interface in the embodiment.

Subroutines constituting the reception side channel process will be described in detail first.
Segmentation of Subroutines When a plurality of processes are to be performed with respect to some data by software, the processes cannot be performed at once. For this reason, the following method may be employed. First of all, the data is divided into pieces each having a proper size. Then, a plurality of processes are sequentially performed with respect to one piece of data. When a series of processes is completed, the same processes are performed with respect to the next piece of data. The flow of subroutines sequentially performed with respect to a certain block of data, the flow of data, and the flow of information such as a pointer and an effective cell will be described below with reference to FIG. 3. Referring to FIG. 3, each thick arrow indicates the flow of data, and each thin arrow denoted by reference symbol P indicates the flow of a pointer.

In the reception side input section, received data, which is converted into a data string as a bit expression and stored in a reception side input FIFO 11013, is written as a block of a predetermined amount, into a frame data buffer 209 in the main memory 11203 inside each of the interface processors 112-1 ... 112-n by a received data input subroutine 203. This received data input subroutine 203 transfers a pointer indicating the position of the data written in the memory to a frame synchronization subroutine 204 as the next subroutine.

Upon reception of the pointer from the received data input subroutine 203, the frame synchronization subroutine 204 reads out only a necessary portion of the data in the frame data buffer 209 and performs process. That is, while frame synchronization is not established at all, all the data are sequentially read out and checked, starting from the head of the data. After frame synchronization is established, only a portion corresponding to a frame synchronization bit is read out and checked. The position information of the frame synchronization bit and the like obtained after frame synchronization are transferred to a cell synchronization subroutine 205 as the next subroutine.

In the cell synchronization subroutine 205, only a necessary portion of the data in the frame data buffer 209 is read out and cell synchronization and the like are performed on the basis of the information received from the frame synchronization subroutine 204. More specifically, while cell synchronization is not established, all the cell data of the data is sequentially read out, starting from the head of the cell data, to search for the header of each cell. After cell synchronization is established, only the header portion of each cell is read out to perform error detection and correction in the header portion as described in I. 432. In addition, after cell synchronization is established, the readout data is written in a cell header accommodation buffer 210 for collecting only cell headers in the main memory 11023, with the first four bytes of the header being grouped into one word.

After the cell synchronization subroutine 205, two subroutines, i.e., a descramble subroutine 206 and ATM layer function handling subroutine 207, are performed.

Information indicating the number of cells in the data in the frame data buffer 209, the start position of each cell, and the validity of each cell is transferred from the cell synchronization subroutine 205 to the descramble subroutine 206. In the descramble subroutine 206, the payload section of each cell in the frame data buffer 209 is read out on the basis of the information. Descramble process is performed with respect to the readout data, and the data after the descramble process is written in a cell payload buffer 212 in units of cells.

Information indicating the position of each header and the number of headers stored in the cell header buffer 210 is transferred to the ATM layer function handling subroutine 207. In the ATM layer function handling subroutine 207, the cell headers in the cell header buffer 210 are read out on the basis of the information. Policing, routing tag addition, header update process, and the like are performed with respect to the readout headers, and the new headers are written in a buffer 211 for storing headers with routing tags.

Information indicating the position of each cell payload and the position of each header with a routing tag is transferred from these two subroutines 206 and 207 to a received data output subroutine 208 as the last subroutine. In the data output subroutine 208, the cell data are synthesized and output.

The output cell data is temporarily held in the reception side output FIFO 11024 connected to the cell switch 103, as shown in FIG. 1. The held cell data are sequentially read out from the reception side output FIFO 11024 at a speed at which the cell switch 103 receives cell data.

With this subroutine configuration, unnecessary exchange of data between the subroutines can be omitted, and the number of times of data fetching and storing operations, which impose a heavy load on the processor 11201, can be decreased, thereby realizing high-speed process.

Since the subroutines are independently performed, and a pointer and the like for data are exchanged between memories, each subroutine can be easily replaced with hardware. For example, hardware may be used to perform process up to frame synchronization, and software may be used to perform the subsequent processes. Alternatively, hardware may be used to perform process up to the descramble process. Such combinations of hardware and software processes can be relatively freely selected.

Each procedure and each subroutine will be described in detail next.

Reception Side Input Section

In the reception side channel data input section, data input via an interface point is loaded into an internal register (not shown) by using a clock extracted from the data itself by a clock extracting circuit. The data is then serial/parallel-converted by a serial/parallel converter and stored in a reception side input FIFO 11013.

Received Data Input subroutine 203

Figure 4:
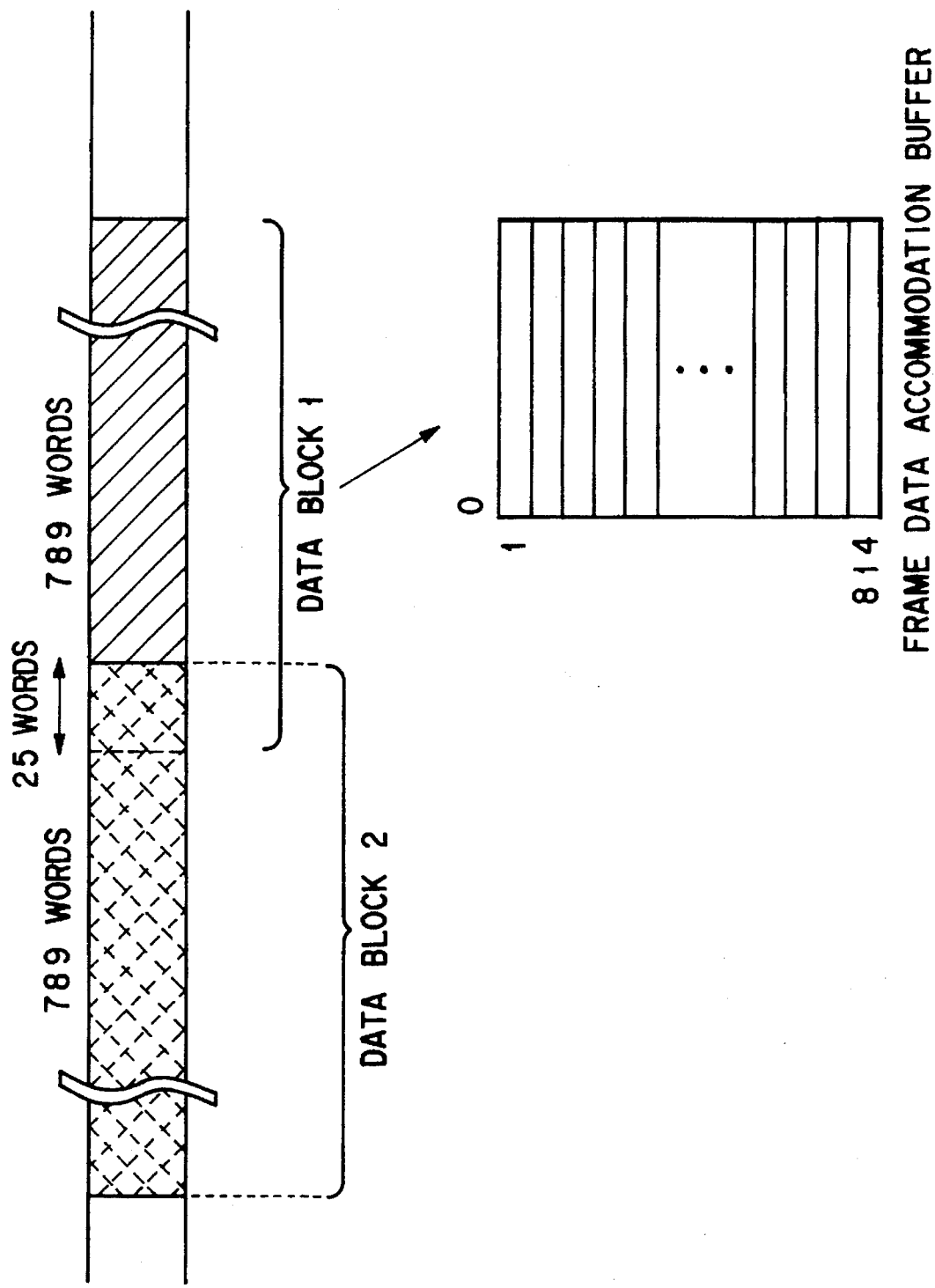
FIG. 4 is a chart showing a reception side channel data input format.

According to the frame structure based on the TTC standard JT-G. 703-a, which is used in this embodiment, frame synchronization can be established once by using one multi-frame consisting of four 789-bit frames. Each process (each subroutine) performed by the processor 11021 with respect to received data is performed for each data corresponding to eight multi-frames, i.e., 25,248 bits or 789 words, as a unit (the number of multi-frames is not limited to eight). In this case, the amount of data to be loaded into the frame data accommodation buffer 209 at a time is set to be 814 words, which is the sum of 789 words and 25 words as a head portion of 789-word data to be loaded next, so as to allow recognition of two frame sync signals in one multi-frame even between loaded data and to load up to the last bit of a cell in which the last bit of 789-word data is included. That is, as shown in FIG. 4, input serial data is divided into 789-word data, and adjacent 789-word data are loaded, with 25-word data therebetween being loaded twice. Such 814-word data loaded at a time will be referred to as a data block hereinafter.

The received data input subroutine 203 writes this data block in the frame data buffer 209, and informs the other subroutines of the position of the data in the frame data buffer 209.

Frame Synchronization Subroutine 204

Frame synchronization is performed first with respect to the data block loaded into the frame data buffer 209, and each frame bit, the position of each user information transfer area, and the validity of each frame are checked. In order to allow the use of information indicating the result of frame synchronization and other information in the next cell synchronization subroutine or the frame synchronization subroutine for the next data block, the following three variables are defined: a frame synchronized state display variable, an effective frame start display variable, and a frame synchronizing start display variable.

The frame synchronized state display variable indicates a frame synchronized state or the number of consecutively received frames having false frame bits. If the frame synchronized state display variable is "−4", it indicates that frame synchronization is not established at all. Similarly, "−3" to "−1" as the frame synchronized state display variable indicates a state wherein three consecutive correct frame sync signals have been checked for frame synchronization (each absolute value indicates the number of correct sync signals to be checked further for establishing frame synchronization); and "0" to "6", a state wherein frame synchronization is established (each value indicates the number of consecutively received frames having false sync signals).

The effective frame start display variable indicates the head of an effective frame determined upon frame synchronization. Cell synchronization is performed with respect to data following data corresponding to this value. If the value is 0, it indicates that all the data are effective. If the value is 26049, it indicates that none of the data are effective.

The frame synchronizing start display variable indicates how many frame sync signals have been checked. If this value of this variable exceeds 25248, 25248 is subtracted from the value. The resultant value is then set as a new frame synchronizing start display variable, and the frame synchronization subroutine is completed. This new frame synchronizing start display variable indicates the point at which frame synchronization is to be started with respect to the next data block.

Figure 5:
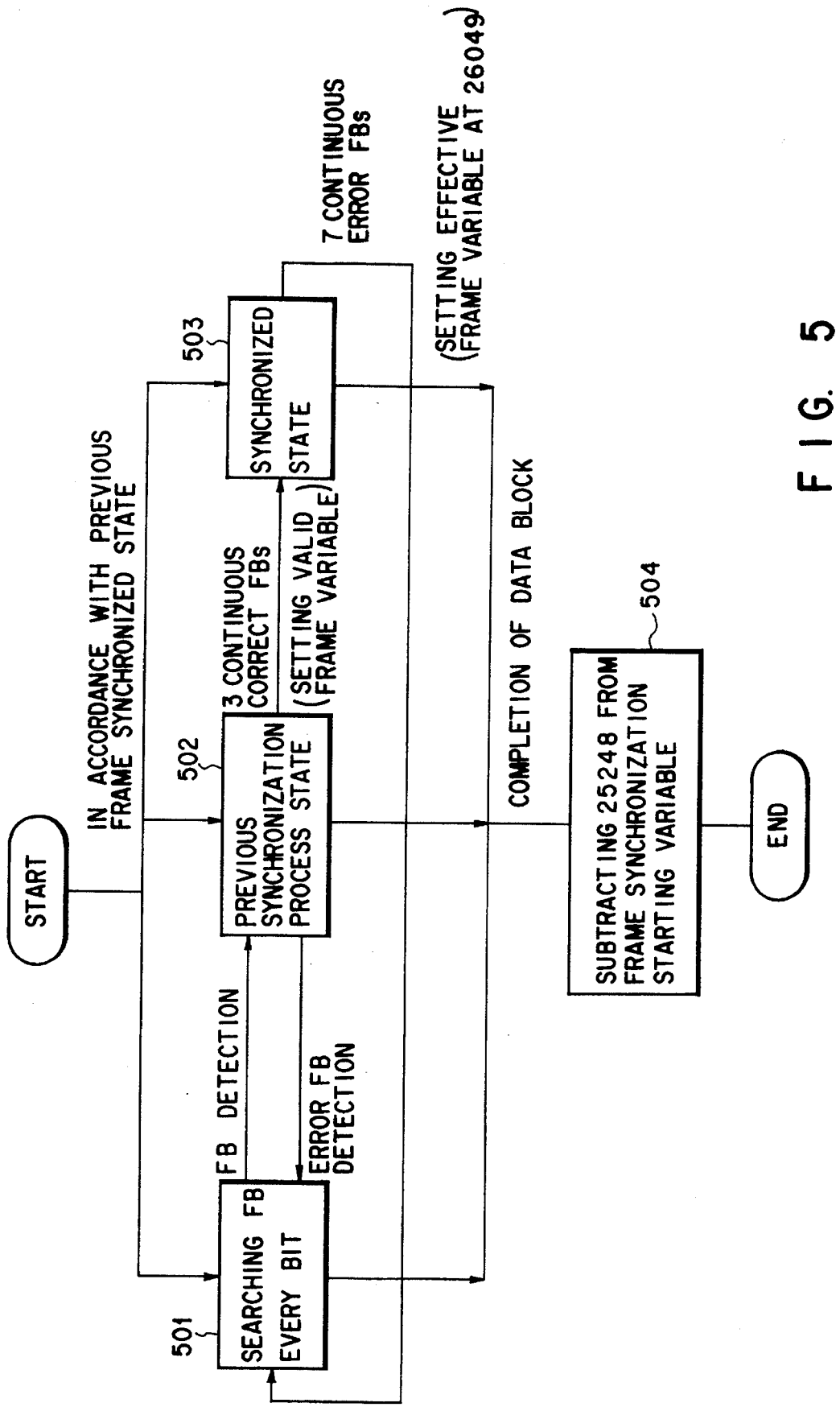
FIG. 5 is a flow chart showing reception side channel frame synchronization process.

The frame synchronization subroutine 204 to be actually executed will be described next with reference to FIG. 5.

When a new data block is written in the frame data buffer 209, the final frame synchronized state in the immediately preceding data block can be determined from the value of the frame synchronizing start display variable.

If the frame synchronizing start display variable is "-4", frame bit synchronization pattern searching 501 is performed with respect to this new data in units of bits. That is, the data in the frame data buffer 09 is sequentially read out in units of words from the beginning, and frame bit synchronization pattern searching is performed with respect to the readout data.

If correct synchronization patterns are found in two frame bits, the frame synchronizing start display variable is incremented by one to search the next multi-frame, and the flow advances to a presynchronization process state 502 in which it is checked whether two synchronization patterns are present at the corresponding positions. In performing this check, only necessary data in the frame data buffer 209 is read out. If there are correct synchronization patterns, the frame synchronizing start display variable is further incremented by one to check synchronization patterns in the next multi-frame. If false synchronization patterns are detected, the frame synchronizing start display variable is set to be "-4" to return to the bit-by-bit searching 501.

If frame synchronization is established after correct synchronization patterns are consecutively detected three times, the start bit of the corresponding frame is set as the frame synchronizing start display variable, and a synchronized state 503 is set. At this time, the frame synchronized state display variable is "0".

In the synchronized state 503, it is checked whether correct synchronization patterns are present at frame bits in all the multi-frames in the data. If an incorrect multi-frame is detected, the frame synchronized state display variable is incremented by one. When a correct frame arrives, the frame synchronized state display variable is set to be "0". If the variable reaches "7", the variable is set again to be "-4", and the effective frame start display variable is set to be "26049" indicating the end of a frame. The flow then returns to the synchronization pattern searching 501 (searching for frame bit synchronization patterns in units of bits).

When these procedures are performed until the frame synchronizing start display variable exceeds a value corresponding to the 789th word of the data block, 25248 is subtracted from the value of the frame synchronizing start display variable (step 504), and the frame synchronization subroutine 204 is completed.

Cell Synchronization Subroutine 205

By performing frame synchronization, cell information areas in the data in the frame data buffer 209 and synchronization for each byte in cell data can be identified. Cell synchronization is then performed with respect to the data in the areas in which the cell information is present, and the position of each cell header and the position of each cell payload are clarified, and correction/detection of errors in header portions is performed.

In order to allow the use of information indicating the result of cell synchronization and other information in the next descramble process or cell synchronization subroutine for the next data block, the following variables are defined: a cell synchronized state display variable, a synchronization cell count, a synchronization cell start bit array, a cell start bit, and an ineffective cell display array.

The cell synchronized state display variable indicates a cell synchronized state, the number of invalid cell headers received, and the like similar to the case of frame synchronization. If the cell synchronized state display variable is "-7", it indicates that cell synchronization is not established at all (a hunting state). Similarly, "-6" to "-1" as the cell synchronized state display variable indicate a state wherein six consecutive correct cell headers have been checked for cell synchronization (pre-synchronized state); "0", a state wherein cell synchronization is established and a header error correction mode is set; and "1" to "6", a state wherein cell synchronization is established and a header error detection mode is set. In the pre-synchronized state, the value of the cell synchronized state display variable indicates the number of valid cells required to achieve a synchronized state. In the header error detection mode in a synchronized state, the value of the cell synchronized state display variable indicates the number of consecutively observed cells having invalid headers.

The synchronization cell count indicates the total number of cells existing at portions, in the data block, in which cell synchronization is established. The start bit of each of these cells is indicated by the synchronization cell start bit array. The cell start bit always indicates the start bit of a target cell upon cell synchronization. Cell synchronization is performed up to a cell including the last bit of the 789th word of the data block. That is, when the cell start bit exceeds 25248, the cell synchronization subroutine is completed. At this time, a value obtained by subtracting 25248 from the value of the last cell start bit is held as a new cell start bit, which indicates the start bit of a cell, of the next data block, from which cell synchronization is to be started.

The ineffective cell display array indicates the ordinal number of a cell, of the above synchronization cells, which is determined to be invalid because of a header error.

Figure 6:
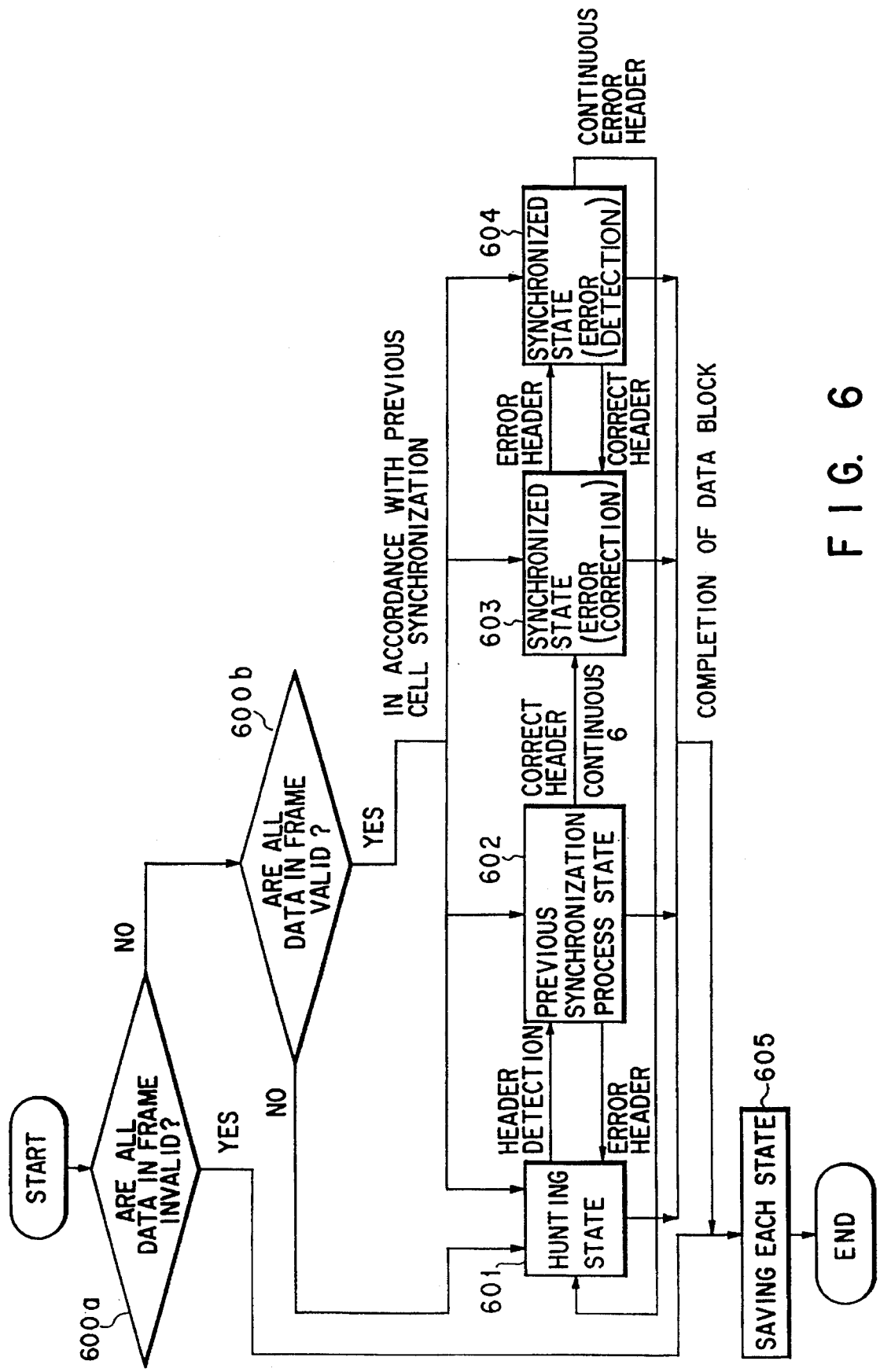
FIG. 6 is a flow chart showing reception side channel cell synchronization process.

The cell synchronization subroutine 205 to be actually executed will be described below with reference to FIG. 6.

When frame synchronization for a new data block loaded into the frame data buffer 209 is completed, the cell synchronization subroutine 205 is started. If the value of the valid frame start display variable from the frame synchronization subroutine 204 is 26049, it is determined that invalid frame is included in the data block (step 600a). In this case, the cell synchronization subroutine 205 sets the value of the cell synchronized state display variable to be "-7" and terminates the process.

If the value of the frame synchronized state display variable is "0", it is determined that all the frames of this data block are valid (step 600b). In this case, process is started from a state based on the value of the cell synchronized state display variable in the cell synchronization subroutine 205.

If the previous cell synchronization subroutine 205 ends in a pre-synchronized state 602 or a synchronized state 603, data based on the cell start bit from the previous cell synchronization subroutine 205 is read out from the frame data buffer 209, and cell synchronization is performed with respect to the data.

In a hunting state 601, data is loaded word by word, starting from the head of an effective frame, and a search for the header of each cell is performed in accordance with byte synchronization provided by frame synchronization. If the value of the valid frame start display variable indicates a frame located halfway in the data block, process is started from the data of the frame in a hunting state. If a correct cell header portion is found in the hunting state 601, the value of the frame synchronized state display variable is set to be "-6" to set the pre-synchronized state 602.

In the pre-synchronized state 602, a header is checked at the cell period. If a correct header is determined, the cell synchronized state display variable is incremented by one. If a false header is detected, the cell synchronized state display variable is set to be "−7" to change the current state to a hunting state. When six consecutive correct headers are determined, and the cell synchronized state display variable becomes "0", the error correction mode 603 in a synchronized state is set.

In the error correction mode 603 in the synchronized state, a cell header is checked at the cell period, and the value of the synchronization cell count is incremented. The start bit of the cell is recorded on an element indicated by the current value of the synchronization cell count of the synchronization cell start bit array, and the cell header is stored in the cell header buffer 210. If an invalid cell header is observed, the value of the synchronization cell count is incremented by one and recorded on the synchronization cell start bit array. Thereafter, an attempt is made to correct the cell header. If the attempt succeeds, the header is stored in the cell header buffer 210. If the attempt fails, the cell is determined as an invalid cell, and the current value of the synchronization cell count is recorded on the invalid cell display array. In addition, an empty cell is output to the cell header buffer 210. If an invalid cell header is observed, the cell synchronized state display variable is incremented by one, and the flow shifts to an error detection mode 604 in a synchronized state.

In the error detection mode 604 in the synchronized state, a header is checked at the cell period, and the synchronization cell count is incremented by one, similar to the correction mode. The synchronization cell start bit is then recorded. If a correct header is observed, the cell synchronized state display variable is set to be "0" to change the current state to the error correction mode 603 in the synchronized state. If an invalid header is observed, no attempt is made to correct the header, and the cell is recorded, as an invalid cell, on the invalid cell display array. The cell synchronized state display variable is then incremented by one. If the value of the cell synchronized state display variable reaches "7", the cell synchronized state display variable is set to be "−7" to change the current state to the hunting state 601.

In any state, when the start bit of a cell or a byte for checking hunting exceeds the 789 words of the data block, the cell synchronization process is completed. In this case, 25248 is subtracted from the current value of the cell start bit to set a new cell start bit, and the subroutine is completed.

Several methods of actually establishing cell synchronization and performing header error correction may be considered. For example, a method realized by hardware is disclosed in Jpn. Pat. Appln. KOKAI Publication No. 4-363927. According to this method, with regard to cell synchronization, a portion assumed to be a header is loaded bit by bit or byte by byte, and division according to GF(2) is performed, thereby checking whether the value of a total of five bytes is a desired value. When error correction is to be performed in a synchronized state, a result of division with respect to five bytes is set as an initial value, and the same division is repeatedly performed in units of bits or bytes, thereby finding a correction position.

As a cell synchronization method used in this embodiment, a method of applying the above cell synchronization method to a software program will be considered. As indicated by the flow chart shown in FIG. 7, while cell synchronization is established, consecutive 1-byte data D1, D2, D3, D4, and D5 of a header portion are sequentially read out (steps 701 to 705), and a division process 706 and addition on GF(2), i.e., an exclusive OR process (707) for each bit, are alternately performed. Finally, determination 708 is performed to determine whether the header portion is a header. In this case, a read operation must be performed five times for one process.

If each division process 706 is expressed as a polynomial as an input is defined as DI and an output as Do, the operation is represented as follows:

$$DO = DI * X^8 \bmod G(X) \quad (1)$$

for $G(X) = X^8 + X^2 + X + 1$

In a hunting state, as described above, determination on a cell header is performed while each data is shifted by one byte. Therefore, the number of times of read process can be decreased by properly using an immediately preceding process result, as in the method disclosed in Jpn. Pat. Appln. KOKAI Publication No. 4-363927.

Figure 8:
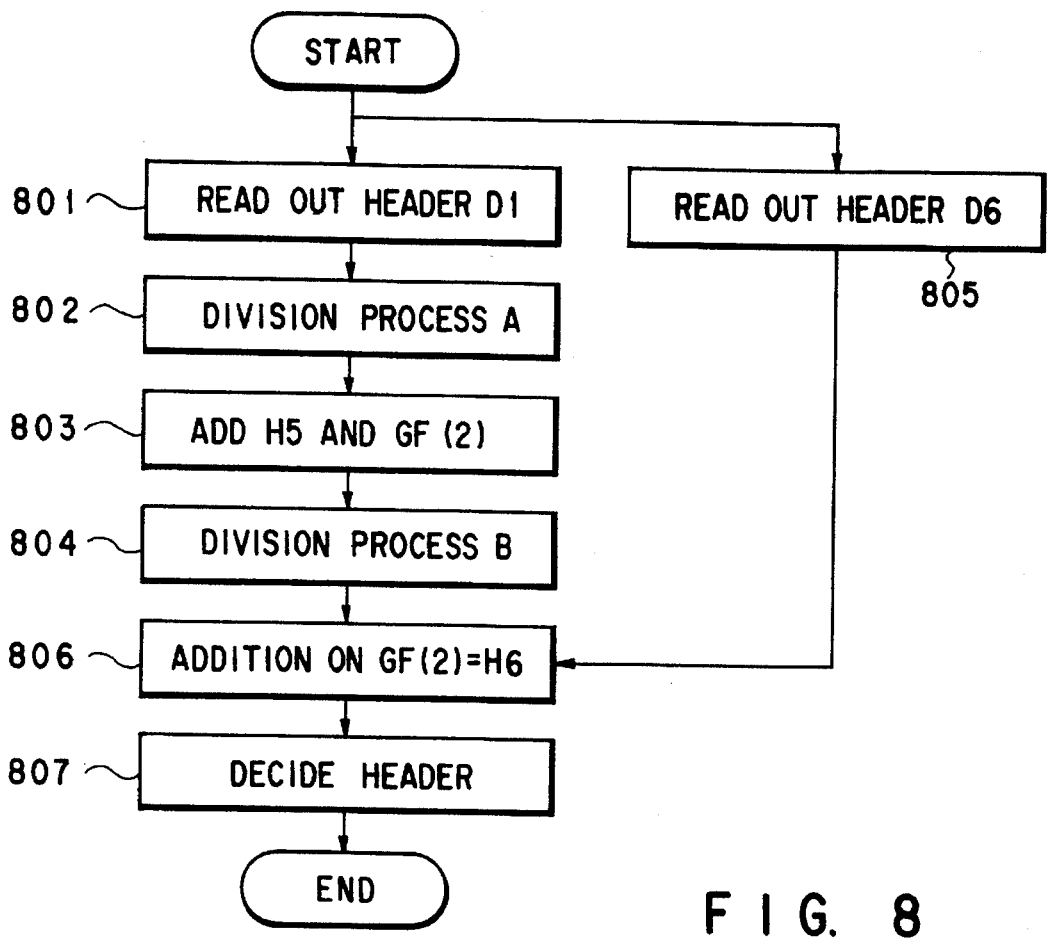
FIG. 8 is a flow chart showing cell synchronization process in which a header is shifted byte by byte in a hunting state.

Assume that process for cell synchronization is performed with respect to five consecutive bytes, i.e., data D1, D2, D3, D4, and D5 at a given timing. In this case, a value obtained by division and an exclusive OR process is H5. Processing for data D2, D3, D4, D5, and D6, each shifted from a corresponding one of the above data by one byte, is performed according to the flow chart shown in FIG. 8 as follows.

First of all, the data D1 is read out again (step 810), and a division process 802 different from the previous division process is performed. Letting DI be an input and DO be an output, the division process 802 is expressed as a polynomial as follows:

$$DO = DI * X^{32} \bmod G(X) \quad (2)$$

An exclusive OR 803 between this result and H5 is calculated for each bit, and a division process B 804 expressed by equation (1) is performed with respect to all the exclusive ORs. In addition, an exclusive OR 806 between the above result and the readout data D6 is calculated. If the resultant value is equal to a desired value ("01010101" in binary notation), it is determined that the corresponding portion is a header. Otherwise, it is determined that the portion is not a header.

Figure 7:
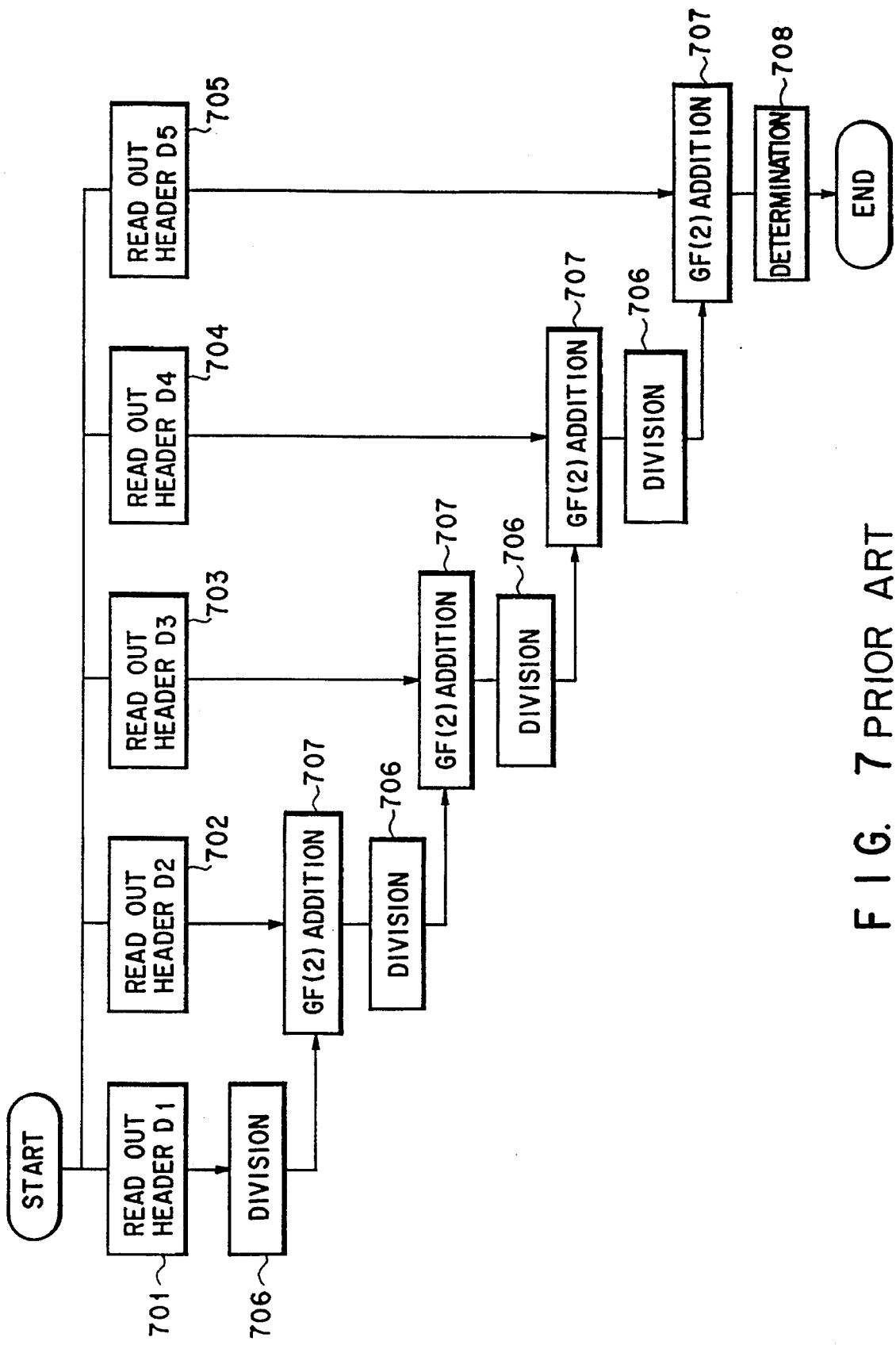
FIG. 7 is a flow chart showing conventional cell synchronization process.

According to this scheme, the number of times of read process is two, as against five in the case shown in FIG. 7, thus reducing the process amount.

In the invention disclosed in Jpn. Pat. Appln. KOKAI Publication No. 4-363927, however, the data width per read operation is limited to eight bits. If, therefore, a high-performance CPU such as a 32- or 64-bit CPU is to be used as in this embodiment, a deterioration in efficiency occurs.

For this reason, when a 32-bit CPU is to be used, a method of reading first four bytes at once may be used. In this method, the number of times of read process can be decreased, as compared with the method of performing read process five times.

Figure 9:
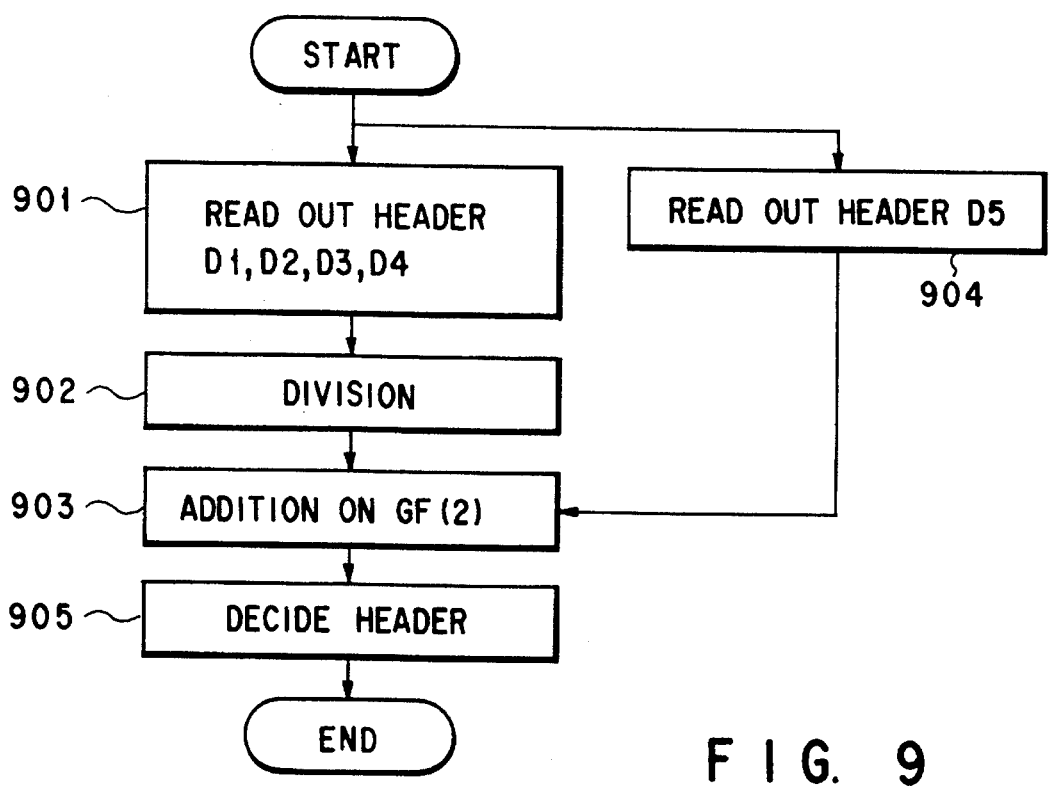
FIG. 9 is a flow chart showing cell synchronization process in which data D1 to D4 are read out at once.

For example, as shown in FIG. 9, first of all, first four bytes D1, D2, D3, and D4 of a header are read out at once (step 901). A division process 902 is then performed with respect to the readout data. It takes much time to perform this division process by sequentially dividing 32-bit data by G(X) of equation (1). This cancels out the advantage obtained by decreasing the number of times of read process to two. Considering the above division process for each bit, the following relationship is found between each bit and the corresponding result. Each bit of the bytes D1 to D5 is expressed as follows:

$$D1 = (d[1], d[2], \ldots, d[8]) \quad (3a)$$

$$D2 = (D[9], d[10], \ldots, d[16]) \quad (3b)$$

$$D3 = (D[17], d[18], \ldots, d[24]) \quad (3c)$$

$$D4 = (D[25], d[26], \ldots, d[32]) \quad (3d)$$

$$D5 = (D[33], d[34], \ldots, d[40]) \quad (3e)$$

Eight bits r[i](i=1 to 8) as a result of division are sequentially expressed as follows, starting from the upper bit:

$$\begin{aligned}
r[1] = &\; d[2] + d[3] + d[5] + d[10] + d[12] + \\
&\; d[14] + d[15] + d[17] + d[19] + d[21] + \\
&\; d[25] + d[26] + d[27] + d[33]
\end{aligned} \quad (4a)$$

$$\begin{aligned}
r[2] = &\; d[3] + d[4] + d[6] + d[11] + d[13] + \\
&\; d[15] + d[16] + d[18] + d[20] + d[22] + \\
&\; d[26] + d[27] + d[28] + d[34]
\end{aligned} \quad (4b)$$

$$\begin{aligned}
r[3] = &\; d[1] + d[4] + d[5] + d[7] + d[12] + \\
&\; d[14] + d[16] + d[17] + d[19] + d[21] + \\
&\; d[23] + d[27] + d[28] + d[29] + d[35]
\end{aligned} \quad (4c)$$

$$\begin{aligned}
r[4] = &\; d[1] + d[2] + d[5] + d[6] + d[8] + \\
&\; d[13] + d[15] + d[17] + d[18] + d[20] + \\
&\; d[22] + d[24] + d[28] + d[29] + d[30] + d[36]
\end{aligned} \quad (4d)$$

$$\begin{aligned}
r[5] = &\; d[2] + d[3] + d[6] + d[7] + d[9] + \\
&\; d[14] + d[16] + d[18] + d[19] + d[21] + \\
&\; d[23] + d[25] + d[29] + d[30] + d[31] + d[37]
\end{aligned} \quad (4e)$$

$$\begin{aligned}
r[6] = &\; d[3] + d[4] + d[7] + d[8] + d[10] + \\
&\; d[15] + d[17] + d[19] + d[20] + d[22] + \\
&\; d[24] + d[26] + d[30] + d[31] + d[32] + d[38]
\end{aligned} \quad (4f)$$

$$\begin{aligned}
r[7] = &\; d[2] + d[3] + d[4] + d[8] + d[9] + \\
&\; d[10] + d[11] + d[12] + d[14] + d[15] + \\
&\; d[16] + d[17] + d[18] + d[19] + d[20] + \\
&\; d[23] + d[26] + d[31] + d[32] + d[39]
\end{aligned} \quad (4g)$$

$$\begin{aligned}
r[8] = &\; d[1] + d[2] + d[4] + d[9] + d[11] + \\
&\; d[13] + d[14] + d[16] + d[18] + d[20] + \\
&\; d[24] + d[25] + d[26] + d[32] + d[40]
\end{aligned} \quad (4h)$$

Note that "+" represents an exclusive OR for each bit.

Programming, therefore, may be performed such that these bits are directly added by exclusive OR process using the above relationship, instead of performing a general division process, to obtain the same result as that obtained by the division process. With this programming, the processing time can be greatly shortened.

Figure 10:
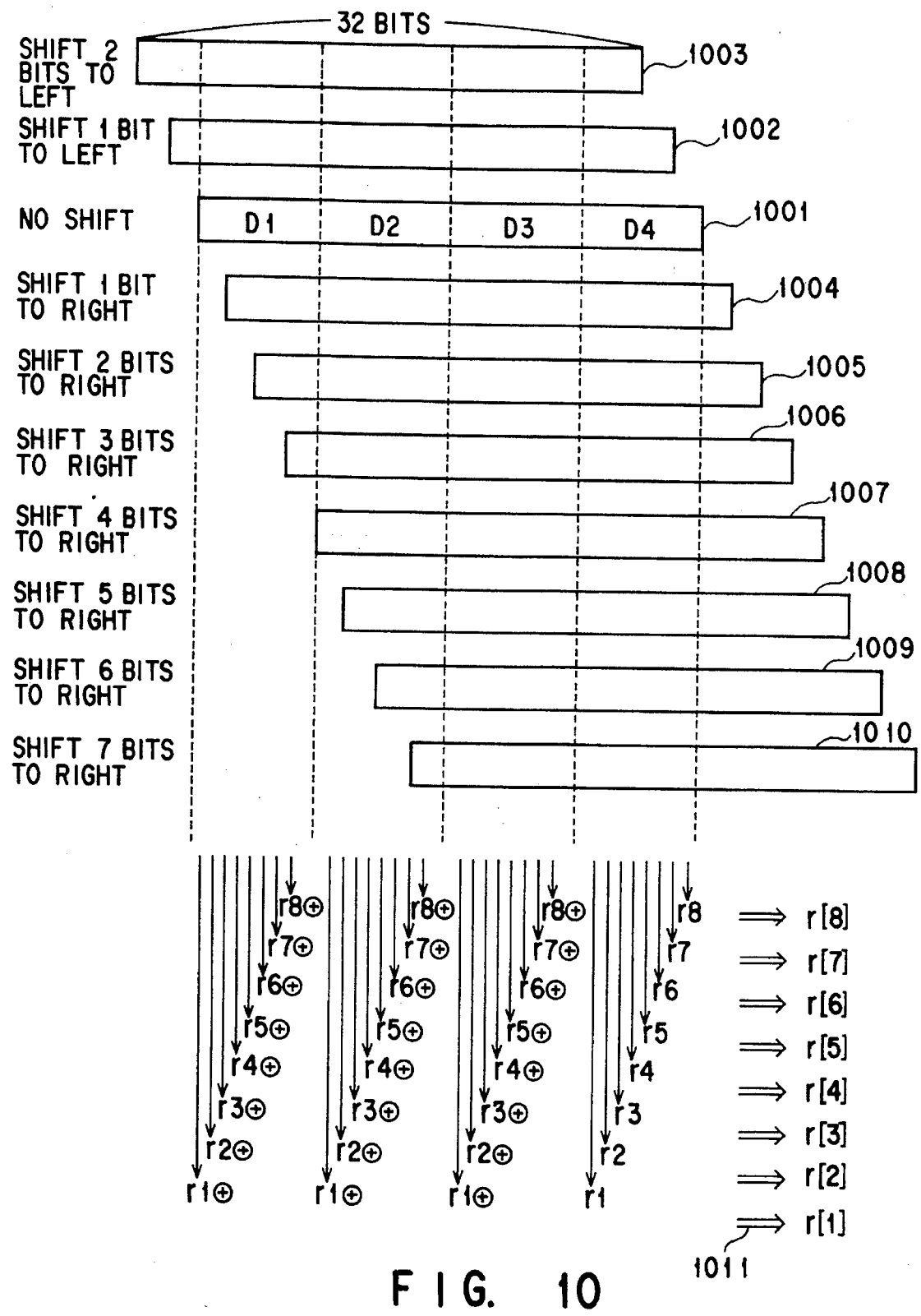
FIG. 10 is a chart for explaining calculation for cell synchronization.

More specifically, as shown in FIG. 10, first of all, the 32 bits of the bytes D1, D2, D3, and D4 of the header are read out. The readout bits are shifted bit by bit by a maximum of seven bits to the left and a maximum of two bits to the right. The first bit of each of the bytes D1 to D4 which are not shifted is set for r[1]. Similarly, the second and subsequent bits are set for r[2], . . . With this operation, exclusive OR process is performed upon extraction of only necessary data.

When this process is completed, the data D5 is read out. Since d[33], d[34], . . . of the data D5 can be sequentially substituted in r[1], r[2], . . . , values r[1] to r[8] for the final header determination can be obtained by simply calculating the exclusive OR between eight bits obtained as a result of the exclusive OR of the above 32 bits and each bit of the data D5. If these eight bits are "01010101", it is determined that the corresponding portion is a header portion.

Figure 11:
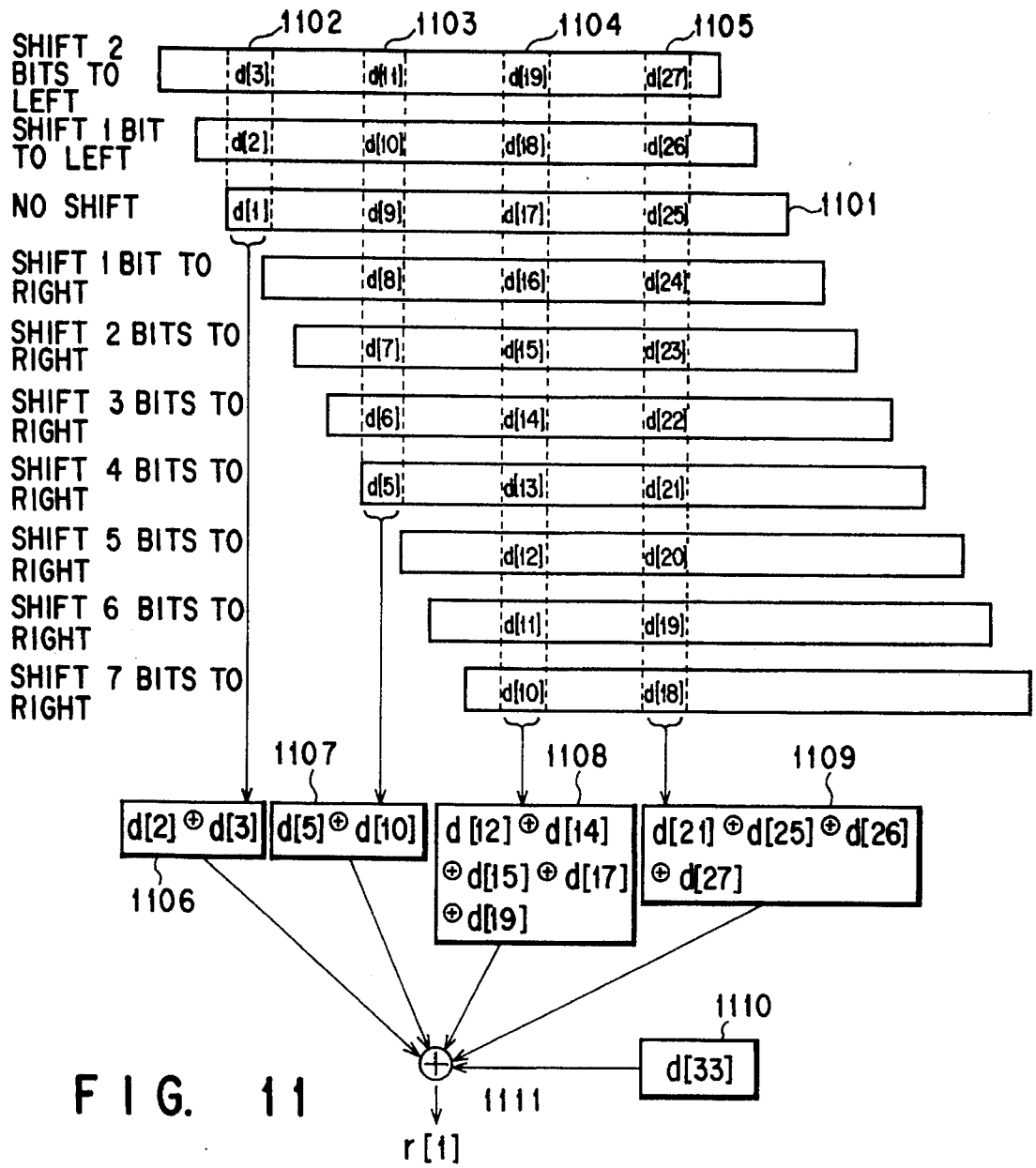
FIG. 11 is a chart for explaining calculation for cell synchronization with respect to r[1] in FIG. 10 in detail.

The program for the process shown in FIG. 10 will be described in more detail below. FIG. 11 shows only a portion for obtaining r[1]. As described above, four register points for r[1] are respectively set at the leftmost bits of D1 to D4. In a register 1101 which is not subjected to a shift operation, d[1], d[9], d[17], and d[25] as the first bits of D1 to D4 are seen. By sequentially shifting this register to the left and the right, data from d[1] to d[27] can be seen.

First of all, only d[2] and d[3] are extracted from a register 1102 corresponding to D1 and are exclusive-ORed. In this case, d[1] is ignored. Similarly, d[5]+d[10] is calculated in a register 1103 corresponding to D2; d[12]+d[14]+d[15]+d[17]+d[19], in a register 1104 corresponding to D3; and d[21]+d[25]+d[26]+d[27], in a register 1105 corresponding to D4. In addition, the outputs from these four registers and d[33] as the first bit of D5 are exclusive-ORed, thereby obtaining r[1]. Other values r[i](i=2 to 8) are obtained in the same manner as described above.

In the register corresponding to r[1], d[28] to d[32] are not seen. This is because these bits need not be used as data obtained as a result of division process. In order to cause all the bits (d[1] to d[32]) to be seen, the register must be shifted by seven bits each to the left and the right. As described above, however, by omitting portions having no influences, the amount of shift to the left can be reduced to two bits.

In these data processes, calculation for data which is repeatedly used a certain number of times may be performed in a register by performing register variable declaration as in C language. With this operation, loading of data from a memory can be reduced in frequency. As a result, the process speed can be increased.

As a method of performing error correction, a technique of performing a division process by using equation (1), as disclosed in Jpn. Pat. Appln. KOKAI Publication No. 4-363927, may be used. In this method, however, readout operation must be performed five times again. For this reason, cumbersome process must be performed on software.

It is known that when r[i](i=1 to 8) are determined, whether error correction can be performed and which bits need to be corrected are uniquely determined. For this reason, a table indicating possibilities of correction and correction bit patterns with respect to all combinations (64) of r[i] is prestored. If obtained values r[i] do not coincide with "01010101", a correction pattern is obtained by referring to the table. With this procedure, error correction can be instantly performed. As is apparent, however, an essential condition for this operation is that cell synchronization is established, and a mode capable of error correction is set.

Descramble Subroutine 206

Since the number of synchronization cells included in the data block and the start bit of each cell are known owing to the cell synchronization subroutine 205, cell payload data is read out from the frame data buffer 209 in accordance with such information. The readout data is written, 12 words at a time, in the cell payload buffer 212 in units of cells while descramble process 214 is performed.

In order to perform descramble process of a given bit of cell payload data, data on the cell payload portion which has arrived 43 bits before the given bit is required. For this reason, the last two words of the payload portion of the last cell of the previous data block are stored as descramble data.

An actual operation is performed as follows.

The first 32 bits of the payload portion of the first cell of the data block are extracted and written in a register. The written data and descramble data are shifted to the left and the right to calculate the exclusive OR between each bit and data 43 bits before the bit. The obtained data is written in a payload output memory. The first 32 bits written in the register are deleted after they are used as descramble data for the subsequent two descramble processes. With regard to the data used for this descramble process, register variable declaration may be performed to decrease the number of times of load process of data, thereby realizing high-speed process.

When the descramble process of the last one word of the payload portion of the last cell of the data block is completed by repeatedly performing the above operation, the descramble process of this data block is completed. At this time, the last two words of this cell are stored to be used for the descramble process of the next data block.

Finally, empty cell data is written in the payload portion of each invalid cell in accordance with the invalid cell display array.

Alternatively, with respect to an invalid cell, the descramble process may not be performed and a fixed pattern may be written in the cell payload buffer 212.

In a descramble method based on the conventional concept of hardware, descramble process is performed in units of bits or bytes. However, the payload portion of one cell is constituted by 48 bytes, and such large amount of data must be read out at least twice for descramble process. For this reason, as in this embodiment, descramble process is performed in units of 32 bits corresponding to the maximum data width of the processor 11201 so that the number of times of read process of data from the memory can be greatly decreased, thereby minimizing the software process amount.

ATM Layer Process subroutine 207

Figure 12:
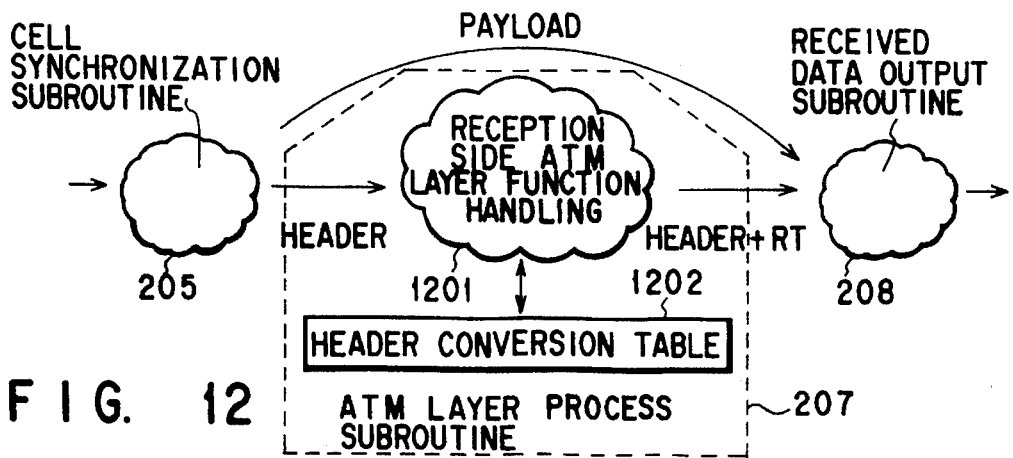
FIG. 12 is a schematic view showing a reception side ATM layer function handling section.

As shown in FIG. 12, an ATM process subroutine 207 is constituted by a reception side ATM layer function handling section 1201 and a header conversion table 1202. The reception side ATM layer handling section 1201 retrieves information corresponding to the header of an ATM cell, extracted by the cell synchronization subroutine 205, from the header conversion table 1202, performs an ATM process such as header conversion, intra-switch routing tag addition, and flow rate monitoring (policing) on the basis of the information, and outputs the resultant data to a received data subroutine 208.

In the header conversion table 1202, information required for the ATM layer function handling is stored. More specifically, new VPI/VCI values or connection identifiers for copy connection, intra-switch path information (routing tag), parameters for policing, and arrival times of a predetermined number of cells in the past (counter values; Tp(n)) are stored in the header conversion table 1202. The new VPI/VCI values and the values of routing tags set in a call setting operation are not changed until the setting is changed. Declared values (T0, X0, T1, X1) for policing are not changed either. The arrival time information is updated every time corresponding VPI/VCI values arrive.

Figure 13:
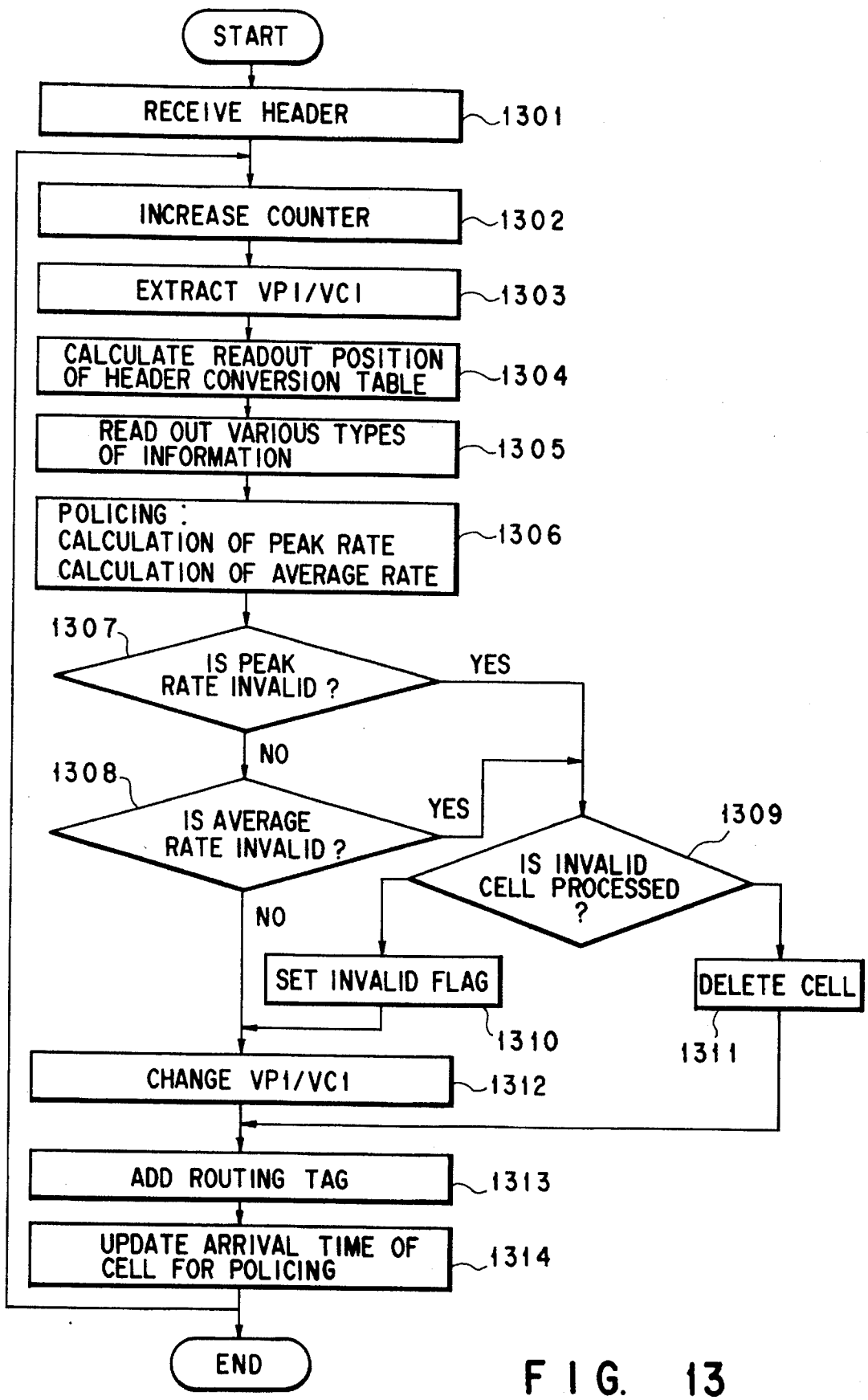
FIG. 13 is a flow chart showing a reception side ATM layer function handling.

The reception side ATM layer function handling section 1201 will be described below with reference to the flow chart shown in FIG. 13.

Exchange of Data with Physical Layer; Step 1301

An ATM cell extracted by a reception side physical layer function handling section is divided into a cell header and a payload portion. The reception side ATM layer function handling section 1201 receives only the header portion of the ATM cell. The payload portion is directly sent to the received data output subroutine 208. Assume that the data width is 32 bits. In this case, since the ATM cell header consists of five octets, two words are required to transfer the header.

For this reason, the header to be sent from the physical layer to the ATM layer is reduced to one word by deleting the HEC field which is not used for processing after the reception side physical layer. If the data width is 64 bits or more, the header can be accommodated in one word without deleting the HEC field. If, however, a control information field (e.g., a routing tag and copy information) for the ATM switch is to be added, the HEC field may be deleted to allow a large field.

Count-Up Operation for Cell Count; Step 1302

The reception side ATM layer function handling section 1201 performs flow rate monitoring (policing). In order to perform policing, however, the arrival time of each cell or an elapsed time between a given cell and a previous cell having the same VPI/VCI values must be known. Since the headers of all input ATM cells (valid, invalid, and empty cells) are sent from the cell synchronization subroutine 205 to the reception side ATM layer function handling section 1201, the arrival time of each cell can be known as a time based on a 1-cell time as a unit of time by counting all the cells. With this method, an accurate cell arrival time can be known at this interface without using clocks independent from clocks on the transmission path which are used for the processor of the switching apparatus, and the like. Even if, therefore, the interface speed is changed, the program need not be changed. A real time can be obtained by multiplying this counter value by a 1-cell time.

If, in this case, the data width for a cell counting operation is m bits, the counter value is incremented one by one from "0". When the counter value becomes $2^m-1$, the counter value is reset to "0" and incremented again.

Extraction of VPI/VCI Values; Step 1303

VPI/VCI values required for routing and policing are extracted from received header information. A VPI value can be obtained by shifting header data (HD) received from the physical process section 2 to the right by (the bit length of a VCI value)+(4 bits), and masking a portion other than the bit length of the VPI value. A VCI value can be obtained by shifting the HD to the right by 4 bits and masking a portion other than the bit length of the VCI value. As described above, even if the bit lengths of the VPI/VCI values change, such changes can be simply handled by only changing parameters for the bit lengths of the VPI/VCI values.

Conversion Table Address Calculation; Step 1304

From the previously extracted VPI/VCI values, reference positions, in the header conversion table 1202, which correspond to the VPI/VCI values are calculated. The reference lengths of the VPI/VCI values are respectively set to be a(bit) and b(bit) which are smaller than the bit lengths of the VPI/VCI values, and positions, in the header conversion table 1202, which correspond to the VPI/VCI values are referred to by using lower a(bit) and b(bit) of the VPI/VCI values.

Information Read Operation; Step 1305

Each information is read out by referring to the header conversion table 1202.

Policing to rate calculation and average rate calculation; step 1306

Policing is performed on the basis of the UNI standard defined by the ATM forum. A method of realizing this process will be described in detail below.

1. Peak Rate Calculation

In this embodiment, as declared values for peak rate monitoring, a time T0 and a maximum cell count X0 representing the maximum number of cells which can exist during the time T0 are used, and the peak rate is represented by X0/T0. Assume that a cell flow arrives at time Tk (k=. . ., n–X0, . . . , n, . . . ). In this case, if arrival time Tn of a target cell to be measured has not reached the time the T0 time after arrival time Tn−X0 of a cell X0 cells before the target cell, it indicates that the target cell violates the declared peak rate. That is, if Tac=Tn−Tn−X0 is smaller than T0, the cell violates the peak rate.

Even if a terminal sends cells while observing the declared values, the cell flow may fluctuate due to buffering and the like in a switching apparatus or the like while it passes through the switching apparatus, resulting in violation of the declared values. For this reason, in order to allow a certain degree of fluctuations, a constant time g is set, and Tac>T0−g is determined as the range of fluctuations. A cell within this range is not determined as a violation cell. In this case, however, Tn=Tn−1+T0 is set as the arrival time Tn, instead of a counter value.

If a cell arrives after the counter is reset, the arrival time interval between the cell and the immediately preceding cell becomes a negative value, which is not a correct value. For this reason, it is assumed that a cell arrives at time Trb, the counter is then reset, and the next cell arrives at time Tra. In addition, assume that the maximum value of the counter is Tcm. In this case, the arrival time interval between cells is not Tra−Trb but (Tcm−Trb)+Tra. Although the arrival time interval in which a counter reset operation is performed may be calculated according to this mathematical expression, a cumbersome operation is required to determine whether a counter reset operation is performed. For this reason, the arrival time interval is calculated according to (Tra−Trb+Tcm) mod Tcm. With this mathematical expression, the arrival time interval can be calculated regardless of a counter reset operation.

2. Average Rate Calculation

As declared values for an average rate monitoring operation, a time T1 and a cell count X1 are used, and an average rate as a monitor value is expressed by X1/T1. Assume that a cell flow arrives at Tk (k=..., n, ...). In this case, every time a cell arrives, the difference between T1/X1 and the time interval between the cell and the immediately preceding cell is accumulated. That is, every time a cell arrives, an update operation of Tad←Tad+((Tk−Tk−1)−T1/X1) (k=..., n, ...) is performed. If this value is negative, it indicates that the corresponding cell violates the declared average rate.

Similar to the case of peak rate monitoring, calculation of the cell arrival time interval is performed without being influenced by a counter value reset operation.

Replacement of VPI/VCI Values; Step 1312

With respect to a cell which is determined, in the above policing operation, as a cell not violating the declared value, the VPI/VCI values are replaced with new VPI/VCI values obtained from a portion corresponding to the VPI/VCI values attached to the cell header in the header conversion table 1202, or the header is replaced with a connection identifier for copy connection.

Routing Tag Addition; Step 1313

In order to allow a cell to perform a self-routing operation in a switching operation, a routing tag in which switching information for the switching operation, retrieved from the header conversion table 1202 on the basis of the VPI/VCI values, is written is added to the header portion in accordance with the switch cell format.

Processing to Be Performed When Cell Violates Peak Rate or Average Rate; Steps 1307 to 1311

If an input ATM cell flow violates any one of declared values (the peak rate or the average rate) in the above policing operation, the ATM layer function handling section performs the following process. In routing tag addition process, a routing tag is added to the cell so that it is determined that the cell is an invalid cell or an empty cell in an ATM switching operation (steps 1311 and 1313). Alternatively, a flag indicating a violation cell is written in the cell (step 1310), and header conversion is immediately performed (step 1312).

Cell Arrival Time Update Processing for Polishing; Step 1314

After routing tag addition (step 1313) is performed, cell arrival time update process for policing is performed. As variables for policing, the arrival times of X0 cells before a current cell are required, in addition to the above declared values X0, T0, X1, and T1 associated with the respective VPI/VCI values. In this embodiment, these arrival times are stored in an array Tp(n) (n=0, 1, ..., X0−1). The contents of this array are updated in accordance with the following algorithm.

If Tp(k)=Tn, then Tp(k−1)=Tn−1, Tp(k−2)=Tn−2, ..., Tp(0)=Tn−k, Tp(X0−1)=Tn−k−1, ..., Tp(k+1)=Tn−X0. When the next cell arrives, Tp(k+1)=Tn+1 and Tp(k+1) are updated. With this operation, in order to perform policing when the next cell arrives, Tp(X0−1) and Tp(0) may be referred to/updated by using k in the case of Tp(k) and Tp(k+1) (k=X0−1).

Thus has been explained the ATM layer function handling subroutine 207.

Received Data Output Subroutine (Corresponding to "208" in FIG. 3))

As a result of the ATM layer function handling subroutine, cells having routing tags added to their headers, which are to be output to the cell switch 103, are stored in the buffer 211 for storing headers with routing tags. At the same time, pieces of information about cells, of the cells obtained by the cell synchronization subroutine, which are not output to the cell switch 103 are obtained. Cells to be output to the cell switch 103 are converted and output on the basis of these pieces of information and the data in the cell payload buffer 212 which is obtained as a result of the descramble subroutine.

Receiving Side Output Section

Cell data from the data output subroutine 208 is stored in the reception side output FIFO 11024. The reception side output FIFO 11024 outputs cell data to the cell switch 103 in accordance with a timing signal from the cell switch 103.

Next, subroutines constituting the transmission side channel process will be described in detail.

Segmentation of Subroutines

A channel process on the transmission side is performed by a process consisting of a plurality of subroutines in the same manner as the reception side. The flows of the respective subroutines, data, and information such as a pointer and an effective cell will be described below with reference to FIG. 14. Referring to FIG. 14, each thick arrow indicates the flow of the data, and each thin arrows denoted by reference symbol P indicates the flow of the pointer.

First of all, a cell sent from the cell switch 103 is input to the transmission side input section, i.e., the transmission side input FIFO 11025. The cell data in the transmission side input FIFO 11025 is written in a switch cell buffer 1409 in the main memory 11023 of a corresponding one of the interface processors 102-1, ..., 102-n by a transmission side input subroutine 1403. If the transmission side input FIFO 11024 is allowed to have a sufficiently large capacity, cell data need not be temporally held in the switch cell buffer 1409, and a portion 1414 enclosed with a dotted line at an upper portion in FIG. 14 is not required.

Only a pointer from the switch cell buffer 1409 is transferred from the transmission side input subroutine 1403 to a transmission side ATM layer function handling subroutine 1404. The transmission side ATM layer function handling subroutine 1404 retrieves cell data from the switch cell buffer 1409 on the basis of this pointer. If the switch cell buffer 1409 is omitted as described above, the cell data is directly sent to the transmission side ATM layer function handling subroutine 1404.

The transmission side ATM layer function handling subroutine deletes a routing tag, added by the reception side ATM layer function handling subroutine, from the cell having a format attending a routing tag so as to convert the cell into a cell having a format on an interface point. In addition, the transmission side ATM layer function handling subroutine performs conversion of VPI/VCI values and shaping, as needed.

As a result of shaping, the order of cells is changed from that upon input to a transmission side ATM layer function handling subroutine 1401. For this reason, the order of cells after shaping is stored in a cell order buffer 1412, and the corresponding pointer is transferred to a physical layer function handling subroutine 1405.

Each cell is divided into a header and a payload portion, which are respectively stored in a header buffer 1410 and a payload buffer 1411. Only the pointers of these portions are transferred to the physical layer function handling subroutine 1405.

In the physical layer function handling subroutine 1405, scramble process of a payload portion, calculation of a header and an HEC portion, and insertion of cell data in a frame are mainly performed. First of all, data required for framing is read out, in units of cells, from the payload buffer 1411 in accordance with cell output order information in the cell order buffer 1412, and scramble process of the readout data is sequentially performed. In this insertion process, a header corresponding to the payload portion is read out from the header buffer 1410, and an HEC value corresponding to the readout 4-byte header is calculated and added thereto. The resultant header is combined with the scrambled payload portion to form cell data. The cell data is then inserted in the frame. This data is written in an output frame data buffer 1413 and transferred to an output subroutine 1406. In this case, if the transmission side output FIFO 11014 has a sufficiently large capacity, or the physical layer function handling subroutine is started upon detection of an empty state of the transmission side output FIFO 11014, frame data need not be temporarily stored in the output frame data buffer 1413 but can be directly transferred to a transmission side output subroutine 1406 to be written in the transmission side output FIFO 11014. In this case, a portion 1415 enclosed with a dotted line at a lower portion in FIG. 14 is not required.

As described above, similar to the reception side channel process, the transmission side channel process is divided into a plurality of subroutines. Therefore, software and hardware can be freely combined. For example, scramble process of a payload portion may be replaced with hardware.

In the transmission side physical layer function handling, process is performed in accordance with the data width of the processor 11021 to reduce the amount of software process, as in the reception side physical layer process.

In a process based on the conventional concept of hardware, in order to generate an HEC value, a header is read out byte by byte four times, and division process must be performed for each read operation. In the 32-bit CPU in this embodiment, however, an HEC value can be easily obtained by reading out the first four bytes of a header at once and performing exclusive OR process or referring to a table.

In scramble process, 48-byte data must be read out per cell, as in descramble process. In this embodiment, such data is read out in units of 32 bits or the like corresponding to the data width, and hence the number of times of read process can be decreased as compared with the conventional scheme of reading out data in units of bits or bytes.

In addition, since the scrambled data is directly written in the frame output FIFO, i.e., transmission side output FIFO 11014, the data need not be temporarily written in the internal cache memory. Therefore, the number of times of write process can be decreased.

In general, a processor need to spend much time in order to perform write and read accesses with respect to the memory and the FIFO. For this reason, data is processed by effectively using the data width of the processor, which exceeds one byte as described above, to decrease the number of times of write and read accesses, thereby reducing the amount of process to be executed by the processor.

Each procedure and each subroutine will be described in more detail below.

Transmitting Side Input Subroutine 1403

Cell data output from the cell switch 103 is held in the transmission side input FIFO 11025. The transmission side input subroutine 1403 writes the data held in the FIFO in the switch cell buffer 1409 in the main memory 11023 of a corresponding one of the interface processors 102-1, . . . , 102-n and transfers the pointer of the data in the switch cell buffer 1409, information indicating the number of cells stored, and the like to a transmission side ATM layer function handling subroutine 1404 as the next subroutine. If the portion 1414 enclosed with the dotted line at the upper portion in FIG. 14 is to be omitted, this subroutine simply serves to transfer the data from the FIFO to the transmission side ATM layer function handling subroutine 1404.

Transmitting Side ATM Layer Process Subroutine 1404

The reception side ATM layer function handling section adds information such as a routing tag and a copy tag to a cell and converts the cell into one having a switch cell format. In contrast, the transmission side ATM layer function handling subroutine 1404 deletes the information added by the reception side ATM layer function handling section from the cell and restores it to the ATM cell format at the interface point. At the same time, the transmission side ATM layer function handling subroutine 1404 separates the cell into a cell header and a payload portion to facilitate scramble process of the payload portion performed by the transmission side physical layer function handling section (to be described later).

If a copy function is added to the cell switch 103, instead of performing conversion of VPI/VCI values in the reception side ATM layer function handling section, the following scheme is effectively performed. A connection identifier which is effective only in the switching apparatus is added to a cell. The transmission side ATM layer function handling subroutine refers to a VPI/VCI value conversion table by using this connection identifier to update the VPI/VCI values.

The state of an input cell flow changes owing to congestion control in the cell switch or multiplexing with cells from other paths. As an effective measure against such a change in state, a shaping process for shaping a cell flow in accordance with declared values is executed in the transmission side ATM layer function handling subroutine 1404.

In performing a shaping process, the time-based position of a cell (subjected to shaping) in an output cell flow needs to be identified. For this reason, cells transferred from the ATM layer function handling subroutine 1404 to the physical layer function handling subroutine 1405 are counted, and the count value is used, as a time based on a 1-cell time as a unit, for shaping. With this operation, the processor need not have a timer function. As described above, by counting cells transferred to the physical layer function handling section, shaping can be performed at the cell transfer rate in the physical layer function handling subroutine even in an ATM layer function handling subroutine 1404 corresponding to the cell switch 103 in which the cell transfer rate is set to be higher than that at an interface point so as to improve the cell discarding characteristics.

Physical Layer Function Handling Subroutine 1405

By the physical layer function handling subroutine 1405, frames are generated one by one. According to a frame structure used as a model in this embodiment, cell data included in one frame consists of 96 bytes, which correspond to nearly two cells. The end of a cell rarely coincides with the end of a frame. For this reason, the following data must be exchanged between subroutines for generating frames. The data are: a frame write point, a cell read point, scramble data, an intra-memory cell write variable, an intramemory cell read variable, and the like. The frame write point indicates the position of the next write operation in a frame in units of bytes and takes a value from "0" to "95". The cell read point indicates the position of the next read operation in a cell in the main memory 11023 of the interface processor 102-1 in units of bytes and takes a value from "−52" to "52".

The value of the cell read point becomes negative when an empty cell is output because no cell which can be output is present in the main memory 11023. The absolute value of the negative value indicates a specific byte in the empty cell. The scramble data is used for scramble process of the first two words of this data block. The scramble data consists of the last two words of the previous data after scramble process. As is apparent, when framing of the data block is completed, the last two words of the data block after scramble process are stored.

The intra-cell write variable indicates a point on the main memory 11023 at which a cell is to be written next. The presence/absence of a cell which can be output is determined by comparing this value with the value of the intra-memory read variable indicating a point at which a cell is to be read out. If the value of the write variable is equal to that of the read variable, there is no cell which can be read out. If the value of the write variable is larger than that of the read variable, there is a cell which can be read out. When read process of one cell is completed, the cell read point is incremented by one and is compared with the write variable again.

A procedure for actually generating a new frame will be described below with reference to FIG. 15.

First of all, excess data (0 to three bytes) which overflows the last word of the previous frame is inserted in the head portion of the current frame (step 1501). In practice, all the data of one word is written. The processor receives a frame write point corresponding to the number of bytes of the excess data, and starts to write the next data in accordance with the value of the point, thereby writing the excess data in the frame.

Subsequently, the processor checks, on the basis of the value of the cell read point, how the previous physical layer function handling has completed.

Assume that framing in the previous physical layer function handling has completed during output process of an empty cell (YES in step 1502). In this case, if output process is to be started from output of an HEC value (YES in step 1503; cell read point="−4"), the HEC value of the empty cell is written in the output frame data buffer 1413 (step 1504). Thereafter, the data of the empty cell is scrambled and written in the buffer (step 1505). In this case, since the header pattern of an empty cell is a fixed value, the program includes the HEC value as a constant. Therefore, the corresponding empty cell HEC data need only be output. If output process is to be started from output of a payload portion (NO in step 1503; cell read point="−5" or less), the remaining portion of the payload portion of the empty cell is scrambled and written in the buffer (step 1505).

Assume that the previous framing has completed during output process of a valid cell (YES in step 1506). In this case, if output process is to be started from output of an HEC value (YES in step 1507; cell read point="4"), the HEC value is calculated from the value of the header and written in the buffer (step 1508). Thereafter, the payload portion is scrambled and written in the buffer (step 1509). If output process is to be started from output of the payload portion (NO in step 1506; cell read point="5" or more), the remaining payload portion is scrambled and written in the buffer (step 1509).

After steps 1505 and 1509 are performed, or if NO is obtained in step 150, i.e., the previous process is completed at the end of a cell (cell read point="0" the following process is performed.

It is checked (step 1510 or 1515) whether a valid cell which can be output is present in the main memory 11023 of the processor. In accordance with this determination result, a valid cell is output (steps 1511 to 1513 or steps 1516 to 1518) or an empty cell is output (step 1514 or 1519). The write position of each of these data in the buffer is determined by the value of the frame write point. Every time a write operation is performed, the values of the frame write point and the cell read point are updated. When either an empty cell or a valid cell is completely output, the cell read point is initialized to "0", and the intra-memory cell read variable is incremented by one to check again whether a valid cell which can be output is present in the main memory 11023. Output process of the next cell is performed in accordance with the determination result.

The above process is repeatedly performed until the frame is filled with data, i.e., the frame write point becomes "96" or more. When the frame is filled with data, the physical layer function handling subroutine ends after, for example, data for scramble process and data overflowing the frame data are stored and the frame write point is set for the next framing operation.

A procedure for scramble process of a cell payload portion will be described next with reference to FIG. 16. In order to scramble a given bit of a cell payload portion, data having undergone scramble process and output 43 bits before the given bit is required. For this reason, in order to perform scramble process of the current data word, the latest two words of data having undergone scramble process are always held in the register. In this case, if this variable is designated as a register variable on C language, unnecessary load process with respect to the memory can be reduced, and an increase in process speed can be achieved. Actual descramble data can be obtained by performing exclusive OR process of the following three data: 1-word data read out from the cell payload buffer, data obtained by shifting the older data of data of two words for scramble process by 21 bits to the left, and data obtained by shifting the new data by 11 bits to the right. The newly obtained data is output, as cell data, onto the frame and is held, as data for scramble process of the next data, in the internal register of the processor 11021. In addition, the older data of the data of the two words for scramble process is discarded. If no cell which can be read out is in the internal memory, an empty cell is output in the framing subroutine. In this case, however, the payload portion of the data may not be scrambled.

As described in detail above with reference to cell synchronization, an HEC value can be calculated by masking each of 10 data obtained by shifting the data of a header having a length corresponding to one word by a maximum of seven bits to the left and a maximum of two bits to the right, operating necessary bits at any positions in four bytes, and performing exclusive OR process of corresponding bits of the four bytes.

In outputting data, 1-frame data to be transferred to the transmission side output FIFO 11014 of a transmission side output subroutine 11201 consists of 24 words and 21 bits. That is, the size of this data does not conform to the word width of a general purpose processor. With regard to this problem, odd data may be held inside by software and added to the head of the next frame to be output.

With the above-described subroutine group, a switching apparatus using a processor as a sequencer and an ALU can be constructed. In the switching apparatus having this arrangement, the throughput of the portion connecting the processor (11021) and the reception side input FIFO (11013), the transmission side output FIFO (11014), the reception side output FIFO (11024), and the transmission side FIFO (11025) becomes a factor which interferes with improving the throughput of the switching apparatus itself. A method of improving the throughput between these FIFO memories and the processor to improve the throughput of the switching apparatus will be described next.

Figure 17:
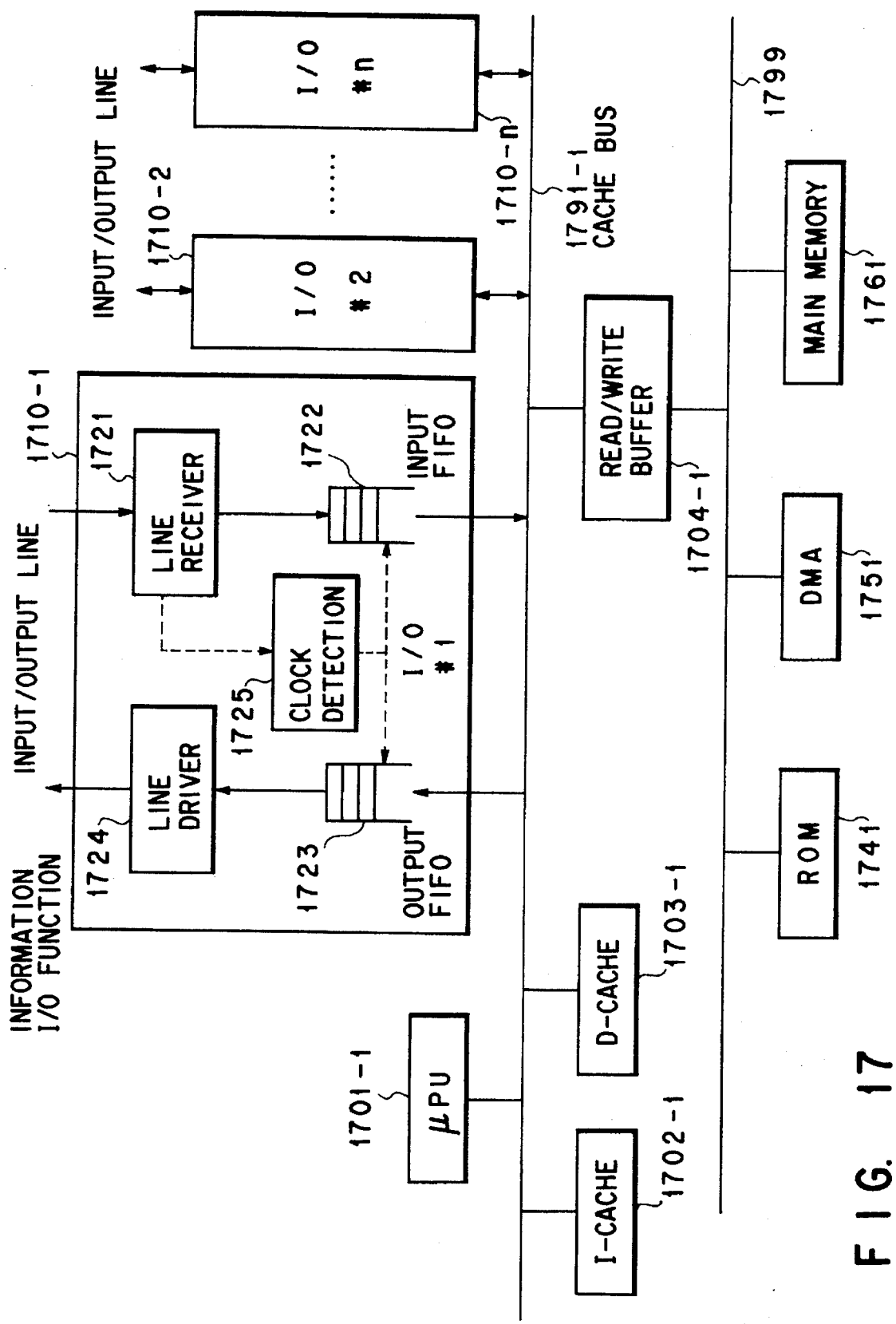
FIG. 17 is a block diagram showing the arrangement of an ATM switching apparatus according to another embodiment of the present invention.

Referring to FIG. 17, a microprocessor (μPU) 1701-1 is a RISC type microprocessor such as an R3000 available from MIPS corporation. This microprocessor is used to perform switching process of information including ATM cells input/output to/from the information input/output functions 1710-1 to 1710-n.

In this case, an information input/output function in the present invention indicates hardware arranged to exchange information between the processor and external units (i.e., the interface points and the cell switch). The information input/output function includes a FIFO for temporarily holding information from/to external units, in order to set a processing time in the processor as described above.

In the embodiment, the input/output functions 1710-1 to 1710-n are directly connected to a cache-bus 1791-1 for connecting the microprocessor 1701-1 to an instruction cache (I-cache) 1702-1 and a data cache (D-cache) 1703-1. In this embodiment, the input/output functions are connected to the cache-bus 1791-1, instead of connecting them to a memory-bus 1799, so as to decrease the latency of communication between the information input/output function and the D-cache 1703-1, thereby improving the throughput of the switching apparatus.

As is apparent, similar to a general scheme, information which cannot be written in the cache area is written in a main memory 1761 connected to the memory-bus 1799 via a read/write-buffer 1704-1. In this embodiment, the memory-bus 1799 is controlled by a DMA controller (DMA) 1751, and transmission/reception of data is performed by DMA transfer.

FIG. 17 shows an arrangement for executing information input/output functions in this embodiment. In a method based on this arrangement, after bit synchronization is established with respect to data sent via input/output lines, the data is sequentially written in an input FIFO 1722, and the microprocessor 1701-1 sequentially transfers the input data to the D-cache 1703-1, starting from the head portion of the input FIFO 1722. Data having undergone switching process is sequentially written from the D-cache 1703-1 into an output FIFO 1723 of each of the information input/output functions 1710-1 to 1710-n, and the data is sequentially output to an output line, starting from the head portion of the output FIFO 1723.

The microprocessor 1701-1 writes the input data from each of the information input/output functions 1710-1 to 1710-n at a proper storage area in the D-cache 1703-1, and sequentially performs a physical layer function handling, an ATM layer function handling, and a switching process with respect to the data.

Software used in this embodiment is stored in the I-cache 1702-1 or a ROM 1741.

As described above, in this embodiment, the information input/output functions 1710-1 to 1710-n are directly connected to the cache bus. As is well known, with the recent rapid advances in the microprocessor techniques and the device techniques, high-speed microprocessors and large-capacity cache memories have been developed. Although it is still expected that data with a high burst rate is input to a switching apparatus, the upper limit of the transfer rate of the data is determined by the speed of a transmission line. Therefore, significant data may be transmitted at a rate lower than the speed of the transmission line, but will never be transmitted at a rate higher than the speed of the transmission line. A microprocessor which is said to be the fastest microprocessor (e.g., a microprocessor capable of operating at 200 MHz, called an alpha chip available from DEC Corporation) at present operates on a clock faster than 155 MHz corresponding to a typical interface speed in the ATM communication scheme.

In addition, currently available microprocessors are allowed to have large-capacity cache memories (for example, a 256-KB cache memory can be incorporated in an R3000). That is, the capacity of such a cache memory is large enough to process general data packets.

As a high-speed SRAM, a memory having an access time of 10 ns and a storage capacity of 1 MB has already been developed. A faster cache memory having a larger storage capacity is expected to be developed in the future.

With advances in such functions, if ATM switching is performed with an arrangement in which information input/output functions are directly connected to a cache bus, as in this embodiment, it is expected that no disturbance is caused in an instruction pipeline in the microprocessor 1701-1 by data transfer between the information input/output functions 1710-1 to 1710-n. Therefore, the embodiment can realize an ATM switching apparatus faster than a conventional ATM switching apparatus.

Consider, for example, a 6.4-Mbps I/F as one of ATM interfaces. Since the frame length of the 6.4-Mbps I/F is 789 bits×4 frames=3156 bits, data corresponding to one frame is 3 Kbits=0.4 KB at most. In contrast to this, the cache memory in the microprocessor R3000 used in the embodiment can have a capacity of 256 KB at maximum, which is large enough for the capacity of a cache memory.

Even if significant data is to be sent from all such 6.4-Mbps I/Fs, since the microprocessor R3000 operates on a 25-MHz clock (one clock to one instruction) corresponding to the standard operation speed, data transfer from the interface points to the cache memory can be satisfactorily executed.

When the 6.4-Mbs I/Fs described above are to be operated by the 25-MHz R3000 (microprocessor 1701-1), it is only required that 3,156-bit data be written in the input/output FIFOs 1722 and 1723 in each of the information input/ output functions 1710-1 to 1710-n. In this case, the R3000 can assign an instruction cycle count of about 12,000/n to process of each of the information input/output functions 1710-1 to 1710-n. Assume that the microprocessor 1710-1 operates at a high speed, e.g., at 100 MHz. In this case, if ATM switching process required for each input/output line corresponds to 12,000 instructions or less, 4×4 ATM switching process can be realized by the ATM switching apparatus of this embodiment. In this case, a FIFO length of about 800 bits is sufficient for each of the input/output FIFOs 1722 and 1723.

FIG. 18 shows the arrangement of an instruction pipeline in the R3000 used as the microprocessor 1701-1. The following are processes in the respective cycles in the pipeline shown in FIG. 18:

IF: instruction fetch (access to the I-cache in this case)

RD: fetching of operand from processor register

ALU: execution of instruction operand

MEM: memory access (access to the D-cache in this case)

WB: writing of result in register file

In the MEM cycle of the cycles in this instruction pipeline, the microprocessor 1701-1 reads/writes data from/in the D-cache 1703-1 or the information input/output functions 1710-1 to 1710-n. As is apparent from FIG. 18, since the MEM cycle and the IF cycle (access to the I-cache 1702-1) overlap each other, the R3000 accesses both the I-cache 1702-1 and the D-cache 1703-1 in one cycle. In practice, when the R3000 operates at 25 MHz, it accesses each of the cache memories 1702-1 and 1703-1 at an access speed of 50 MHz. For this reason, in this embodiment, the I-cache 1702-1, the D-cache 1703-1, and the bidirectional FIFOs 1722 and 1723 in each of the information input/ output functions 1710-1 to 1710-n perform a data input/ output operation at an access speed of 50 MHz.

As described above, as a high-speed SRAM, a memory having an access time of 10 ns (access speed of 100 MHz) and a capacity of about 1 MB has already been developed. In addition, a FIFO having an access time 20 ns or less (access speed of 50 MHz or more) and a capacity of 3 Kbit or more has already been developed.

Considering these points as well, with the arrangement of this embodiment, ATM switching process of data sent from the information input/output functions 1710-1 to 1710-n can performed in practice without disturbing the instruction pipeline in the microprocessor 170-1.

In addition, since the header portion of an ATM cell consists of 4 Bytes (32 bits), if process is to be performed by using a 32-bit microprocessor as in this embodiment, the header portion of the ATM cell can be read out or written with one instruction (in one MEM cycle) of the instruction pipeline shown in FIG. 18. Therefore, ATM layer function handling and switching process can be performed very efficiently.

Hereinafter, an OAM process will be described below with reference to FIG. 2 again.

Data input/output between a transmission and a reception line includes OAM data as well as user data. In each channel process described above, user data is processed. A special process is prepared for OAM data. For example, as OAM data, a cell for loop back is used to specify a portion of failure. It is specified that a cell for designating loop back can designate loop back process of the cell in a connection path or a switching apparatus (or a terminal) having an arbitrary end point.

Since a special cell header value is assigned to a cell carrying OAM data, whether a given cell is a cell carrying OAM data or a user cell can be determined in an ATM layer function handling section. However, it cannot be determined only from the cell header value whether the cell carrying the OAM data is a cell for designating loop back or a loop back point is the corresponding node. Loop back cells include cells before loop back and cells after loop back, and only cells before loop back are subjected to loop back. However, information indicating whether a cell is before or after loop back is not written in the cell header but is written in the cell payload portion. This makes the process more complicated.

As described above, process of OAM data is more complicated than a conventional channel process for user data. For this reason, the data channel in a conventional switching apparatus constituted by hardware, OAM data is extracted independently of user data and subjected to process based on software in many cases.

In addition, software is generally used to perform process such as updating of a routing tag table upon a change in the state of connection and notification of statistic information, produced by the data channel, to the outside. Such process is also called OAM process.

In this embodiment, the OAM process is performed by an OAM process unit on the processor. As shown in FIG. 2, the OAM process unit comprises a transmission/reception section 141 for an OAM cell message and a supervisory control process 142 for processing a table and statistic information. The channel process comprises an OAM cell branching/ inserting section 113 and a supervisory control interface 114. The OAM process unit also includes an interface 143 for a switching apparatus control processor 104 for controlling the overall switching apparatus and informing the values in the tables in the channel process 101 to the OAM process 102.

A speed adjustment process is an exceptional process other than OAM process. If data input from the frame buffer on the reception side is lost owing to a bit error or the like, a shortage of data to be transferred to the cell switch 103 may occur. In cell process performed by hardware, buffers are arranged between the respective process stages shown in FIG. 2 to perform insertion of dummy data (empty cell when a shortage of data occurs in an output side buffer.

In cell process performed by the processor, there are interface points at which the output speed of information must be kept constant independently of the speed of received effective information. They are a transmission point and an interface point for the cell switch 103 which operates at a constant speed. In cell process performed by the processor, speed adjustment must be realized by software process. In this embodiment, speed adjustment is performed by empty cell generators 129 and 139.

Figure 21:
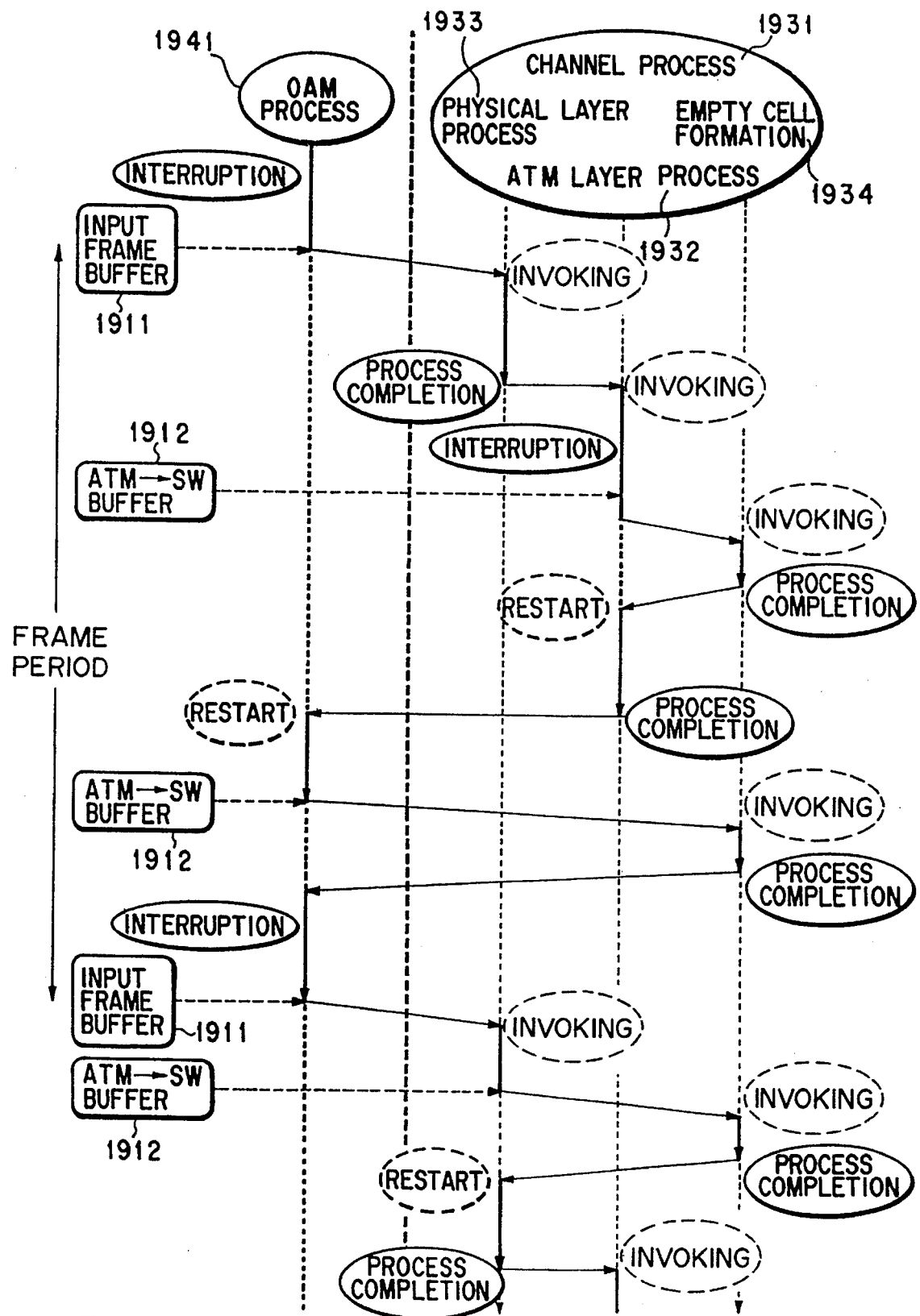
FIG. 21 is a chart showing the process timing on the reception side of the switching apparatus in FIG. 17.

One example of how process for satisfying the requirements for each process is started, resources such as a processor are assigned, and data is exchanged will be described in detail below with reference to FIGS. 19 (reception side) and 20 (transmission side). FIGS. 21 (reception side) and 22 (transmission side) respectively show the flows of process in terms of time.

The process on the reception side will be described first with reference to FIG. 19.

Bit data input via a reception side line is stored in an input frame buffer 1911 using a FIFO. The input frame buffer 1911 is an expression for managing the reception side input FIFO 11013 in a software manner. When the amount of data stored in the input frame buffer 1911 in a hardware manner becomes a predetermined value or more (as is apparent, it is assumed that data having a length large enough to allow recognition of a frame is stored in the buffer), the input frame buffer 1911 outputs an interrupt request to a processor R to start channel process. This start condition means that reception process is started before the reception buffer overflows when the remaining capacity becomes a predetermined value or less. A physical layer function handling 1932 is started by the interrupt request.

As a method of starting this reception side physical layer, a method using timer interruption may be employed, instead of the method using an interrupt request from the input frame buffer 1911. According to this method, the processor R receives data from the input frame buffer 1911 at predetermined time intervals, and starts physical layer function handling. A channel process 1931 of the physical and ATM layers is started by the interrupt request.

A series of operations in the channel is basically performed without being interrupted by other processes until process of a block of bit data stored in the input frame buffer 1911 is completed and the resultant data is transferred to the cell switch 103. Since the channel process is not interrupted, the process can be completed within a predetermined period of time except for a case wherein a process having a high priority generates interruption. That is, a strict real time process condition is satisfied.

Assume that a process having a high priority generates interruption during the execution of a given process. Even in this case, if the upper limit value of the processing time for the process is known, the given process can be completed within (the execution time for the given process)+(the execution time for the process having a higher priority than the given process).

Since the process can be completed within a predetermined period of time, no received data in the input frame buffer 1911 is lost even if a received data overflow occurs. As is apparent, in order to prevent an overflow, the processing time required for the channel process 1931 and the maximum wait time till the start of the process must be estimated, and the channel process 1931 must be started by generating an interrupt in consideration of the possibility of an overflow.

In such assignment of the processor resource, a proper process priority is assigned to a channel process, and interruption is inhibited, thereby preventing other processes from stealing the processor resource.

In the physical layer function handling 1932, after line decoding of an input bit string is performed, frame synchronization is established. This process is performed by detecting a synchronization bit having a physical layer frame structure. At this time, determination of a synchronization bit need not be performed with respect to all data. If synchronization cannot be established after a certain amount of bit data is checked, the frame synchronization process may be terminated, and a frame synchronization step-out may be informed to an OAM process 1941. This method is effective in preventing the processor time from being wasted by trying to detect a frame synchronization pattern from input data including no frame information.

In addition to information for display of a frame synchronization step-out, information transferred from the physical layer function handling 1932 to the OAM process 1941 includes the bit error count of received frame and other statistic information. The bit error count of received data may be informed to the partner side depending on the interface protocol for the physical layer. The data amount of this value to be transferred is very small, and the requirements concerning a delay are moderate. In order to facilitate implementation of the channel process 1931, the data may be temporarily transferred to the OAM process 1941. It is not preferable for the channel process 1931 aiming at a high-speed operation to have interfaces for a plurality of processes such as a partner side channel process (which can be executed in various forms). The interface between the physical layer function handling 1932 and the OAM process 1941 will be described later (described in detail later with reference to a statistic information table).

Subsequently, a search for ATM cell synchronization, i.e., an ATM cell header, is performed in a user data transfer area in a bit string for which frame synchronization is established. In cell synchronization process, correction of cell headers and detection process of header error cells and physical layer empty cells are performed at once. Further, descramble process is performed with respect to the payload of each of the input cells.

With the above process, the positions of the valid cell headers and payload portions in the bit string are confirmed.

Subsequently, an ATM layer function handling 1933 is performed with respect to each cell. Basically, on the ATM layer, the value of each cell header is read, and header conversion, routing tag addition, flow rate monitoring, and transmission of the cells are performed.

In the ATM layer function handling 1933, payload data is not directly referred to. For this reason, in a condition in which the physical layer function handling 1932 and the ATM layer function handling 1933 share the same memory space of the main memory 11023, only a pointer indicating the location of a cell payload portion is transferred, instead of the cell payload portion, from the physical layer function handling 1932 to the ATM layer function handling 1933 to reduce overhead of data transfer therebetween, as described above. This method is effective in decreasing the number of times of memory access and increasing the execution speed. In this embodiment, the physical layer function handling 1932 writes the contents of a cell payload portion in a common buffer 1921, and writes the pointer and the header value in a physical layer/ATM layer input cell pointer queue 1923.

The ATM layer function handling 1933 is subsequently started. Since the physical layer and the ATM layer on the reception side are processes in which the flow of data is sequential, if the two layers are implemented as the first and second half portions of the same process on the OS, context switching between the processes and exclusive control process of common buffer access can be saved.

In the ATM layer function handling 1933, a cell header and a pointer are extracted from the queue 1923, and header conversion, routing tag addition, and policing are performed. In the ATM layer function handling, when a cell is to be finally output to the ATM switch 1902, data at the location indicated by the pointer of the cell is combined with the cell header and the routing tag, and the resultant data is transferred to an ATM→SW buffer 1912. In this case, the ATM→ SW buffer 1912 is an expression for managing the reception side output FIFO 11024 of FIG. 1 in a software manner.

As a unit of period in which the physical layer function handling is activated, at least 1-frame period is required because a frame structure must be recognized. For this reason, in order to simplify exclusive control, when the ATM layer function handling 1933 is to be started following the physical layer function handling 1932, the number of cells formed by the ATM layer function handling and written in the output ATM→SW buffer 1912 is determined by the number of cells included in a transmission frame. For example, in 620-Mbps SDH transmission frame process, about 160 cells are generated upon processing of one frame. On the physical layer, in order to recognize a frame, data corresponding to at least one frame must be processed. If, therefore, the ATM layer function handling 1933 is to be started following the physical layer function handling 1932, at least 160 cells must be processed.

Most of the cells generated as a result of this process are written in the output ATM→SW buffer 1912. If the capacity of the output ATM→SW buffer 1912 is too small to store such a number of cells, the unit of process on the ATM layer must be decreased. In some method, the unit of processing in the physical layer is decreased to a value smaller than one frame, and when process of cells which can be stored in the output ATM→SW buffer 1912 is completed, an ATM process is started to process the cells.

Assume that the physical layer function handling is constituted by dedicated hardware. In this case, since there is no physical layer function handling, the ATM layer function handling may be started in accordance with the timing of a "cell generation signal" sent from the hardware as the physical layer function handling.

A pointer indicating an empty buffer upon completion of a transfer operation is set in an empty buffer pointer queue 1922. The physical layer function handling 132 extracts the address of the empty buffer from the empty buffer pointer queue 1922 when writing a cell in the buffer, and writes the contents of the cell payload portion at the address. Then, the physical layer function handling 1932 enqueues the address to the input cell pointer queue 1923. The cell buffer 1921 is cyclically used in this manner.

Consider buffer management. Since an ATM cell has a fixed length, even if the storage area of the buffer is divided to be managed, buffer management can be satisfactorily performed with a large number of fixed-length areas prepared in the buffer. When the management unit for the storage area is a variable length, garbage collection is performed to prevent the storage area from fragmentation. Garbage collection is one of the factors which interfere with the real time performance of a process, but need not be performed in processing an ATM cell.

ATM cells include user cells and OAM cells. The above description is associated with process of user cells. OAM cells are processed independently of user cells. Processing of OAM cells will be described below.

If a header read in the ATM layer function handling process 1933 corresponds to an OAM cell, a pointer indicating a buffer in which the corresponding cell is stored is transferred from the ATM layer function handling 1933 to the OAM process 1941.

In order to ensure the real time performance of a channel process, the OAM process 1941 is not started when the pointer is transferred thereto, but the channel process is continued. No problem is posed in this process because the time limitations imposed on an OAM process are more moderate than those on a channel process.

Although an OAM cell on the physical layer is to be branched on the physical layer according to protocols, an implementation method is restrained by the protocols. An OAM cell on the physical layer is identified by checking the value of the cell header. For this reason, it is preferable, from the viewpoint of easiness of process, that an OAM cell of the physical layer be branched by OAM cell branch process for the ATM layer, similar to an OAM cell of the ATM layer.

Since no cell is processed on the physical layer, branching of an OAM cell to an OAM process, which is performed to ensure the real time performance of a channel process, is the only process performed in an ATM layer function handling.

If a request is generated by the OAM process at the same time of branching of a received OAM cell to insert a cell in a cell flow on the ATM layer, the cell is inserted instead of the branched cell. Assume that an empty cell on the ATM layer is detected. In this case as well, if a cell insertion request is generated by the OAM process, the empty cell is discarded, and the OAM cell is inserted.

The cell insertion request from the OAM process 1941 is written in an OAM→channel transfer cell pointer queue 1925. If a cell extracted from the input cell pointer queue 1923 by the ATM layer function handling 1933 is an empty cell, it is checked whether a pointer is written in the OAM→channel transfer cell pointer queue 1925. If a pointer is written in the queue 1925, the ATM layer function handling determines that a cell output request is generated by the OAM process 1941, and writes an OAM cell header and a payload portion, which are to be output instead of the empty cell, in the output ATM→SW buffer 1912.

When a cell generated by the OAM process 1941 is to be transferred to the channel process 1931, an area for writing the cell must be ensured in the common buffer 1921. Instead of this operation, the OAM process 1941 may access the empty buffer pointer queue 1922. However, conflict control for the empty buffer pointer queue 1922 is required in this case. As a result, the execution time of the channel process 1931 is undesirably prolonged. For this reason, in this embodiment, an area held for a cell received from the channel process 1931 is used to transfer a cell generated by the OAM process 1941 to the channel process 1931. In this case, if the number of cells transferred from the channel process 1931 is small, a shortage of area in which cells generated by the OAM process 1941 are written occurs. This problem, however, can be solved by writing a pointer indicating the location of the payload portion of an empty cell in a channel→OAM transfer cell pointer queue 1924, together with the header, under a predetermined condition, e.g., when the OAM— channel transfer cell pointer queue 1925 is empty.

When an empty cell is present in the channel→OAM transfer cell pointer queue 1924, the OAM process 1941 may preferentially use the empty cell to output an OAM cell. Since no effective information is stored at the address, in the common buffer 1921, indicated by the pointer, the payload portion of the OAM cell to be output is written at this address. Furthermore, the cell header is rewritten into a proper value and written in the OAM→channel transfer cell pointer queue 1925, together with the pointer. Output process of the cell is executed by the channel process 1931.

A pointer indicating the location of the payload portion of an empty cell to be discarded is written in the OAM→ channel transfer cell pointer queue 1925, together with the header. When an empty cell is present in the channel→OAM transfer cell pointer queue 1924, the OAM process uses the empty cell to output an OAM cell. Since no effective information is stored at the address, in the common buffer 1921, indicated by the pointer, the payload portion of the OAM cell to be output is written at this address. Furthermore, the cell header is rewritten into a proper value and written in the OAM→channel transfer cell pointer queue 1925, together with the pointer. Output process of the cell is executed by the channel process 1931.

Upon completion of the ATM layer function handling 1933, a cell handled as a cell header and a pointer indicating the location of a cell payload portion in processing on the ATM layer is written again in an output buffer to the cell switch 103, that is, ATM→SW buffer 1912, according to the cell format in a node coupling a routing tag and a payload portion to the cell header. The ATM→SW buffer is an expression for managing the reception side output FIFO 11024 in a software manner.

This buffer is constituted by hardware, from which data is read out at a constant speed in accordance with the data loading speed of the cell switch 103 and is output to the cell switch 103. When all user information transferred from the physical layer are processed and written in the output buffer to the cell switch 103, the process of the channel process 1931 including the physical layer and the ATM layer is completed.

The channel process 1931 is started depending on the buffer amount of the input frame buffer 1911. If a received bit string is not written in the input frame buffer 1911 owing to a bit synchronization error, the channel process 1931 is not started. As is apparent, in this case, data to be written in the ATM→SW buffer 1912 is not written. In addition, an ATM layer function handling is not performed when frame synchronization and cell synchronization are not established. If a cell pattern is required to operate the cell switch 103, dummy data must be generated and provided by some method.

An empty cell generation process 1934 serves to generate such dummy data. When the capacity of the ATM→SW buffer 1912 becomes a predetermined value or less, the empty cell generation process 1934 is started by interruption caused by the hard logic of the buffer. The empty cell generation process 1934 has a higher priority than the channel process 1931 and is started by the operation of the channel process 1931 to write a predetermined number of empty cell patterns in the output buffer. As the number of empty cells written in the buffer per empty cell generation process increases, the number of times of process start processing decreases, resulting in a reduction in overhead of process start processing. However, the frequency of outputting unnecessary empty cells to the cell switch 103 also increases. If the number of cells written per process is decreased, the reverse happens.

The highest priority is assigned to the empty cell generation process 1934 in the channel process 1931. This is because the cell switch 103 operates normally and the overall switching apparatus operates on the premise of the presence of the output ATM→SW buffer 1912. An empty cell generation request is generated by the output ATM→SW buffer 1912. No other process interrupts in the empty cell generation process 1934. Therefore, an empty cell generation request must be generated before the data amount of the output ATM→SW buffer 1912 become smaller than the amount of cell data which can be continuously sent to the cell switch 103 for a period of time given by (the overhead of start processing of the empty cell generation process)+ (the time required to generate empty cells).

A speed adjustment process can be performed in any one of the series of processes in the cell process performed by the processor. However, the speed adjustment process is preferably performed at a position as close to the output side of the processor cell process as possible, i.e., immediately before the output ATM→SW buffer 1912, in consideration of easiness of implementation and time response characteristics (empty cell insertion is considered as feedback control of the output buffer length). Note that this process may be realized by dedicated hardware for detecting the buffer length of the output ATM→SW buffer 1912 and generating a predetermined empty cell pattern.

Figure 20:
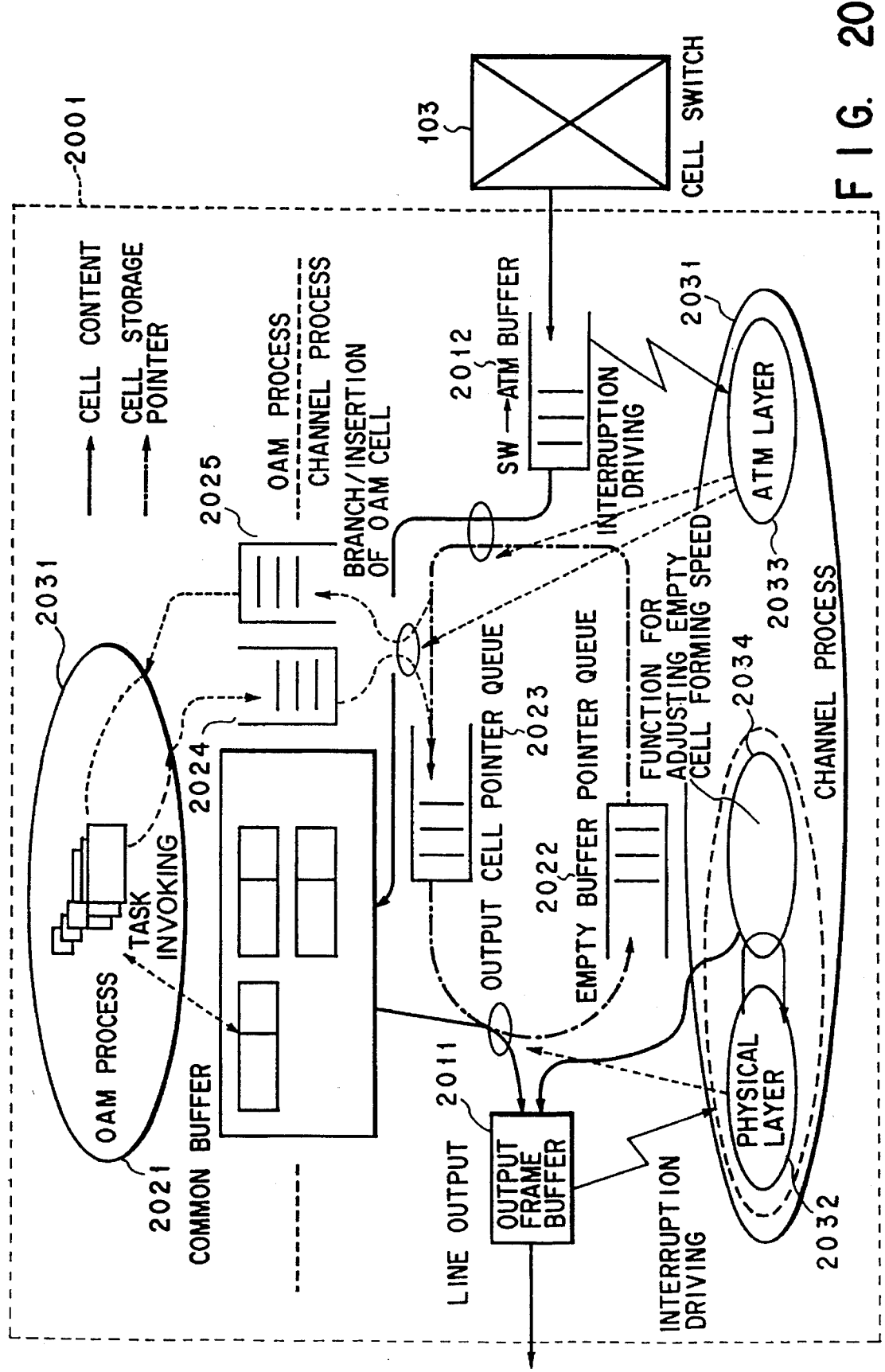
FIG. 20 is a view showing the arrangement of main parts on the transmission side of the switching apparatus in FIG. 17 and the flow of data.

The example of process on the transmission side will be described first with reference to FIG. 20.

The process on the transmission side is performed in almost the reverse manner to the process on the reception side described above. A cell buffer, i.e., SW→ATM buffer 2012 constituted by hardware is connected to an input section between the cell switch 103 and the processor interface. Similar to line input process on the reception side, an ATM layer function handling 2033 is started when the amount of data stored in the SW→ATM buffer 2012 exceeds a predetermined value. The SW→ATM buffer 2012 is an expression for managing the transmission side input FIFO 11025 of FIG. 1 in a software manner.

The following are the conditions for starting the transmission side ATM layer function handling, which are different from those in the method described above. In one method, the remaining capacity of the SW→ATM buffer 2012 is periodically monitored (polling) by timer interruption, and the ATM layer function handling 2033 is started when the remaining capacity becomes a predetermined value or less. In another method, when a transmission side physical layer function handling 2032 requests cells from the ATM layer function handling 2033 to form a frame, the ATM layer function handling 2033 is started, and the transmission side physical layer function handling 2032 receives cells from the SW→ATM buffer 2012 and starts to perform process.

A cell having a routing tag is extracted from the SW→ATM buffer 2012 and stored in a common buffer 2021. Flow rate monitoring, routing tag deletion, and header conversion are performed, and the converted header and the pointer are set in an ATM layer→physical layer output cell pointer queue 2023. Branching/insertion of an OAM cell is performed at this time. When all the cells or a predetermined number of cells in the SW→ATM buffer 2012 are processed, the ATM layer function handling 2033 is completed.

On the reception side, the ATM layer function handling and the physical layer function handling are started as sequential processes. On the transmission side, however, the transmission side physical layer function handling 2032 is started by interruption from an output frame buffer 2031 of the transmission side line interface independently of the end of the ATM layer function handling 2033. The interrupt from the output frame buffer 2031 is occurred when total amount of data in this buffer is less than the predetermined value. The output frame buffer 2031 is an expression for managing the transmission side output FIFO 11014 of FIG. 1 in a software manner.

This is because, on the transmission side, an empty cell generation process 2034 for speed adjustment is executed immediately before the physical layer function handling and a frame cannot be formed without a required amount of cell data (scramble process is influenced by preceding bit data). On the reception side, speed adjustment can be performed simply by generating empty cell patterns and writing them in the buffer. On the transmission side, however, since frame formation process is required after empty cells are inserted to perform speed adjustment, the physical layer function handling and the ATM layer function handling are preferably started independently. If an empty cell insertion point is set before the ATM layer, the ATM layer function handling and the physical layer function handling can be integrated. However, the empty cell insertion point is preferably set to be as close to the output side as possible for the same reason why the reception side empty cell generation process is set immediately before the ATM→SW buffer 1912.

The transmission side physical layer function handling 2032 extracts a predetermined number of cells required for constituting a frame from the output cell pointer queue 2023, and forms a frame. Unnecessary pointers after the extraction of cell contents are set in an empty buffer pointer queue 2022, and the buffer 2021 is used to store cells on the ATM layer again.

If the number of cells in the output cell pointer queue 2023 is not enough to constitute a frame, the empty cell generation process 2034 is called from the physical layer function handling 2032. Empty cell patterns are then generated to form a frame. The empty cell generation process as a speed adjustment function on the reception side corresponds to (the physical layer+empty cell generation process). This is because process on the physical layer is performed in units of frames.

The above process may be replaced with a function 10 of writing pointers indicating empty cell patterns and stored in the main memory in advance and headers indicating empty cells in a FIFO in a hardware manner, when a FIFO formed in a hardware manner between the ATM layer function handling and the physical layer function handling becomes empty.

The reception and transmission processes described so far are real-time processes on which strict restrictions are imposed in terms of the processing time. These processes are started depending on whether transmission/reception data is present. The time required to process a data block such as a frame must fall within a predetermined range.

In contrast to this, the remaining OAM process is a real-time process on which moderate restrictions are imposed in terms of the processing time. Even if the processing load of the OAM process increases with an increase in the number of received OAM cells, the OAM process is allowed to sequentially process the cells one by one. If, therefore, the channel process and the OAM process contend with each other for the system resources (mainly the processor time) of the switching apparatus, it is preferable that resources be preferentially assigned to the channel process, and the remaining resources be assigned to the OAM process. Assignment of the processor time can be properly performed by setting the execution priority of the OAM process to be lower than that of the channel process.

The manner of transferring cells from the channel process to the OAM process and process of OAM cells in the OAM process will be described below.

Figure 19:
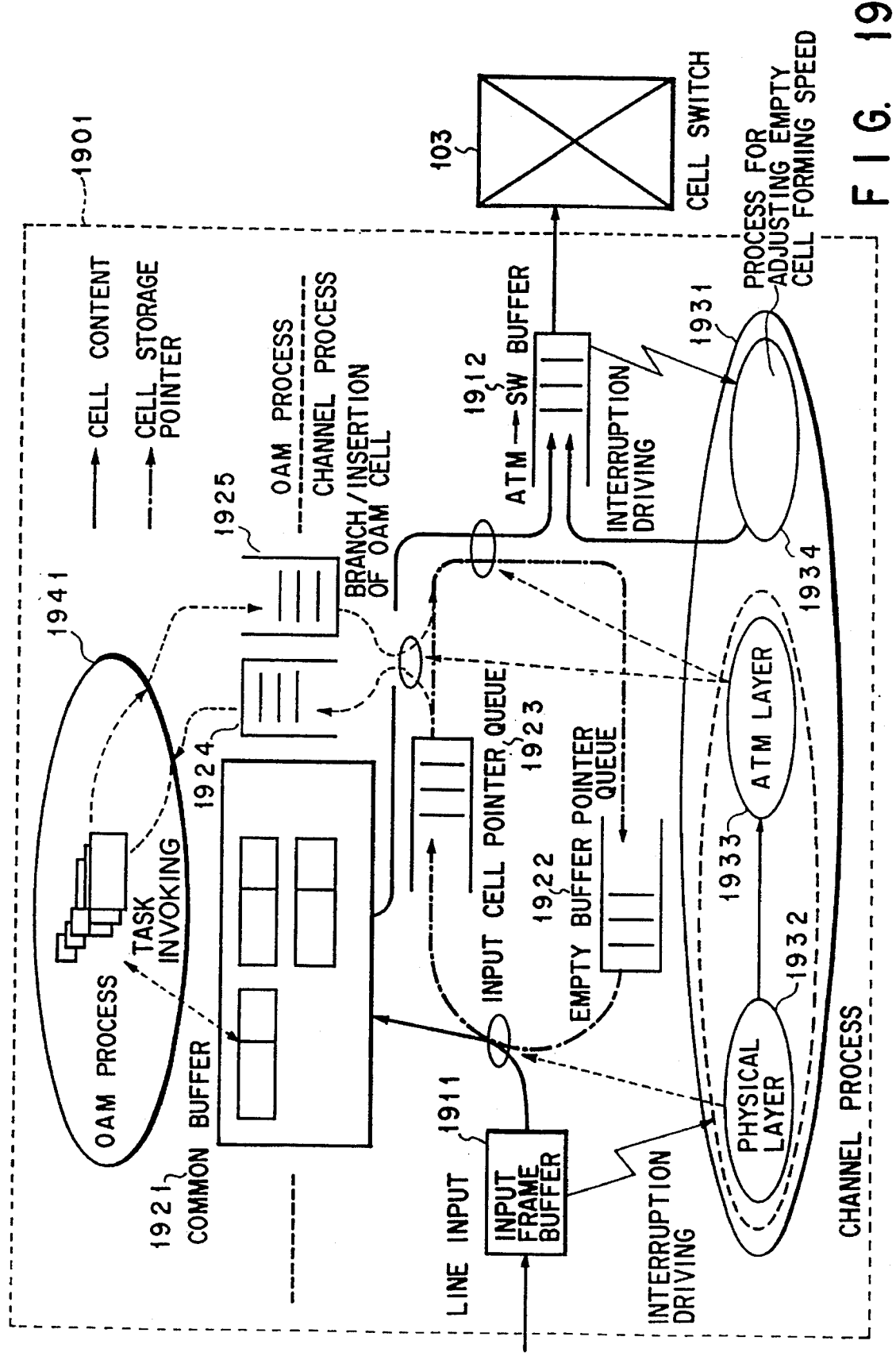
FIG. 19 is a view showing the arrangement of main parts on the reception side of the switching apparatus in FIG. 17 and the flow of data.

Assume that an OAM cell is detected in the ATM layer function handling 1933 on the reception side shown in FIG. 19. The ATM layer writes the cell header and a pointer indicating the location of the payload portion in the channel→OAM transfer cell pointer queue 1924. The payload portion is stored in the common buffer 1921 of the channel→OAM process in advance. With only this process, the process of the OAM cell in the channel process 1931 is completed. The operation of the OAM process 1941 is started when the process in the channel process 1931 is completed and control is passed to the OAM process 1941.

Processing of an OAM cell includes failure notification, loop back, and the like, which demand greatly different operations and processing times. For this reason, only notification to the OAM process 1941 is performed in the channel process 1931, on which restrictions are imposed in terms of the processing time.

The OAM process 1941 reads out the OAM cell header and the pointer indicating the location of the payload portion from a message box. Required process can be known from the values of the header and the payload portion. The process is then started. The contents of the cell to be inserted from the OAM process 1941 are written in the payload storage area (corresponding to one cell), in the common buffer, which need not be kept when the process is started or completed. The header value to be added to the cell and the pointer are written in the OAM→channel transfer cell pointer queue 1925.

Upon detecting an empty cell or an OAM cell, the ATM layer function handling 1933 branches the OAM cell or discards the empty cell, and extracts information of one cell from the OAM→channel message box and inserts it in a cell flow. The buffer area in which the discarded empty cell or the OAM cell output to the cell switch 103 is stored is queued on the empty buffer pointer queue 1922 and used by the physical layer function handling 1932 to store an input cell.

Exclusive control of buffer access between the OAM process and the channel process can be realized in the above manner. The memory resource of the common buffer 1921 which is transferred to the OAM process 1941 is cyclically reused. Since the cell buffer is used as a common buffer, even if the number of cells exchanged between the channel process and the OAM process increases, information of only cell headers and pointers is transferred between the two processes, but cell payload portions need not be transferred.

Statistic information indicating the number of bit errors collected in the channel process 1931 or the number of cells passing therethrough is transferred to the OAM process 1941. In addition, a partner side bit error rate or a cell header conversion table is transferred from the OAM process 1941 to the channel process 1931 and used for channel process. Information designating the operation of the channel process 1931, e.g., a routing tag table, is transferred from the OAM process 1941 to the channel process 1931.

Since the channel process 1931 is started upon interrupting the OAM process 1941, transfer of these values demands exclusive control between the processes.

Although the message box function of a general purpose OS can be used to realize exclusive control, the overhead is large for processing of short data such as statistic information.

As methods of simply realizing exclusive control of table update process, for example, the following three methods can be considered:

[1] Processing for transferring values is set as a system call, and interruption is inhibited during the execution of the process. Table value update process is implemented as a system call of an OS, and interruption from a process having a higher priority is inhibited during the execution of table value update process. Note that the wait time for a process having a higher priority increases owing to inhibition of interruption.

[2] If one entry of a table is contained in one word and a read/write operation is completed with one instruction, exclusive control between processes can be realized by the exclusiveness of the execution of an instruction by the processor itself. The use of this method, however, is limited to a case wherein the consistency of information is kept within one entry, but the method cannot be used in a case wherein consistency of time is required throughout a plurality of entries.

[3] As disclosed in U.S. Pat. No. 5,203,024, if one entry of a table cannot be contained in one word, an "entry rewriting flag" is arranged in an entry. This flag is set while the OAM process is rewriting the entry, and the corresponding cell is discarded when the channel process refers to the entry in which the flag is set. That is, in this embodiment, a pointer indicating the location of the cell in the common buffer 1921 is not output to the empty buffer pointer queue 1922 but is unqueued.

The above process can be implemented as a task in a general purpose OS. In this case, the channel task is started by interruption from hardware. If the channel process which is started in response to a signal from dedicated hardware for the switching apparatus according to the present invention is implemented as a direct interruption handler, the process can be started more quickly.

FIG. 23 summarizes the above-described assignment of priorities to the processes. Basically, higher priorities are assigned to processes belonging to the channel process. Of these processes, a data output process has the highest priority. The priority of the OAM process is low. The channel process must be completed within a processing time unit. In contrast to this, the OAM process is interrupted by the channel process but is resumed from the previous state.

The start timings of processes in a case wherein each of the reception side and the transmission side is constituted by one processor will be described below with FIGS. 21 and 22. This manner can be applied to a system constructed by a plurality of processors.

FIG. 21 shows the process timing on the reception side. Referring to FIG. 21, the vertical direction corresponds to the time axis, and the downward direction indicates the lapse of time.

In this case, the channel process 1931 is started by hardware interruption from the input frame buffer 911 and the output ATM→SW buffer 1912. When no process start request is generated by hardware, the OAM process 1941 is executed.

When an interrupt is generated by the input frame buffer 1911, since the OAM process has the lowest priority, the process is interrupted, and the physical layer process of the channel process is started. When the physical layer function handling completes process of a predetermined amount of data of the bit data stored in the input frame buffer 1911, execution of the ATM layer function handling is started.

The ATM layer function handling sequentially processes cell data received from the physical layer function handling. If the number of cells in the ATM→SW buffer 1912 becomes smaller than a predetermined number during this process, the ATM→SW buffer 1912 generates an interrupt input to start the empty cell generation process. The empty cell generation process generates dummy data (empty cell) and writes it in the ATM→SW buffer 1912 to prevent interruption of patterns supplied to the cell switch 103.

When a predetermined number of empty cells are written in the ATM→SW buffer 1912 and the empty cell generation process is completed, the ATM layer function handling is resumed. When all the cells received from the physical layer function handling are processed and the ATM layer function handling is completed, the OAM process is resumed and executed.

Since the empty cell generation process has the highest priority among the reception side processes, the empty cell generation process is preferentially executed during the OAM process and the physical layer function handling as well as during the ATM layer function handling.

When bit data is stored in the input frame buffer 1911 with the lapse of time, the channel process is started again. The conditions for the generation of an interrupt by the input frame buffer 1911 are that 1-frame data is stored, and data is properly stored in the input frame buffer 1911 upon establishment of bit synchronization. When these conditions are satisfied, the period of interruption from the input frame buffer 1911, i.e., the period of a channel process start operation, coincides with the frame time corresponding to one frame.

FIG. 22 shows the process timing on the transmission side. Referring to FIG. 22, the vertical direction corresponds to the time axis, and the downward direction indicates the lapse of time.

In this case, the ATM layer function handling is started by a hardware interrupt signal from a SW→ATM buffer 2012, whereas the physical layer function handling is started by a hardware interrupt signal from an output frame buffer 2011. When no process start request is output from hardware, the OAM process 1941 is executed.

When a predetermined number of cells or more are sent to the cell switch 103 and stored in the SW→ATM buffer 2012, the execution of the OAM process is interrupted, and the ATM layer function handling is started. When a shortage of transmission data occurs and an interrupt is generated by the output frame buffer 2011 during the execution of the ATM layer function handling, the physical layer function handling is started. This is because the priority of the physical layer function handling is the highest on the transmission side.

The physical layer function handling extracts the cells, which have been processed by the ATM layer, on the basis of information of the output cell pointer queue 2023 and creates output frame data. If the data in the queue is not enough to form a frame, the empty cell generation process is started to compensate the cell shortage.

When a predetermined number of frame data are generated by the physical layer function handling in this manner, the ATM layer function handling, which has been interrupted, is resumed. When all the cells in the SW→ATM buffer 2012 are processed, the ATM layer function handling is completed. The OAM process, which has been interrupted, is resumed. If no interrupt is generated by the output frame buffer 2011, the ATM layer function handling is kept executed. When this process is completed, the OAM process is resumed.

When bit data is output from the output frame buffer 2011 and the amount of data therein decreases with the lapse of time, the physical layer function handling is started again. The condition for the generation of an interrupt by the output frame buffer 2011 is that 1-frame data is stored. The period of interruption from the output frame buffer 2011, i.e., the period of a physical layer function handling start operation, coincides with the frame time corresponding to one frame.

FIG. 24 shows assignment of priorities in a case wherein the transmission side is constituted by one processor. The OAM process can easily perform parallel process on the transmission and reception sides. Therefore, the OAM processes on the transmission and reception sides are preferably implemented as one process to decrease the overhead of a process start operation.

Basically, the transmission side process has a higher priority than the reception side process. This is to quickly output data stored in the switching apparatus to effectively use the overall buffers. Assume that the reception side process is preferentially performed. In this case, if the transmission side process is delayed, data are stored in all the buffers.

Another example of the flow of processing in each interface section on the reception and transmission sides, which is shown in FIGS. 1 and 2, will be described next with reference to FIG. 25.

In this example, some subroutines which are independently performed are synthesized to increase the speed of the channel process. Synthesis of subroutines in this case is based on the concept that all processes which can be simultaneously performed with respect to data written in a register are simultaneously performed.

The flow of process will be described in detail below.

Similar to the case shown in FIG. 2, in this case, the overall process is constituted by a channel process 2501 and an OAM process 2502, and the channel process 2501 is constituted by processes for transmission side process and reception side process.

In the reception side process, a network clock is extracted from a signal received via a reception side line interface by a bit synchronization section 2511 and a network synchronization section 2512, and bit synchronization is established to convert the signal into a bit string. This bit string is decoded by line decoding 2521. The resultant received data is input to a reception side input FIFO 11013. The data input to the reception side input FIFO 11013 is loaded into the internal memory of the processor by a data reception subroutine 2522 of the channel process. First of all, frame synchronization is established with respect to the data loaded into the memory by a frame synchronization subroutine 2523. Cell synchronization is then established by a cell synchronization subroutine 2524. An ATM layer function handling on the reception side is performed by several ATM layer function handling subroutines 2525 (specifically, subroutines for header conversion, routing tag addition, policing, and the like). Finally, descramble process of the data is performed by a synthesized subroutine 2526 (specifically, a descramble process subroutine and a cell output subroutine), and the processed data is sequentially output to a reception side output FIFO 11024.

In the transmission side process, cell data received from the ATM switch is input to a transmission side input FIFO 11025. The cell data input to the FIFO 11025 is loaded into the internal memory of the processor and a transmission side ATM process is performed by a synthesized subroutine 2533 on the transmission side (specifically, a cell reception subroutine and a transmission side ATM layer function handling subroutine). The transmission side ATM layer function handling performed in this case includes shaping process, routing tag deletion process, header conversion process, and the like. The ATM layer function handling needs to be performed only with respect to header portions and hence can be realized without read/write process of the payload portions of the cells between the memory and the register, which imposes a large load. For this reason, the transmission and reception side ATM layer function handling subroutines may be synthesized and performed independently of the remaining subroutine group. A transmission side physical layer function handling including scramble process, generation of HEC values, generation of a frame, and the like is performed by a synthesized subroutine 2532 (specifically, a transmission side physical layer function handling subroutine and a data output subroutine). The resultant data is output to a transmission side output FIFO 11014.

This example exemplifies the method of synthesizing subroutines in the channel process 2501. Such a method of synthesizing subroutines, however, can be applied to the subroutine group in the OAM process 2502. As is apparent, subroutines in the OAM process which can be simultaneously performed may be synthesized, as in the case of the channel process.

With the above synthesis of subroutines, since all processes which can be performed with respect to data loaded into a register at a given moment can be performed at once, the number of times of read/write process of data between the register and the memory can be minimized, thereby further increasing the processing speed.

Figure 25:
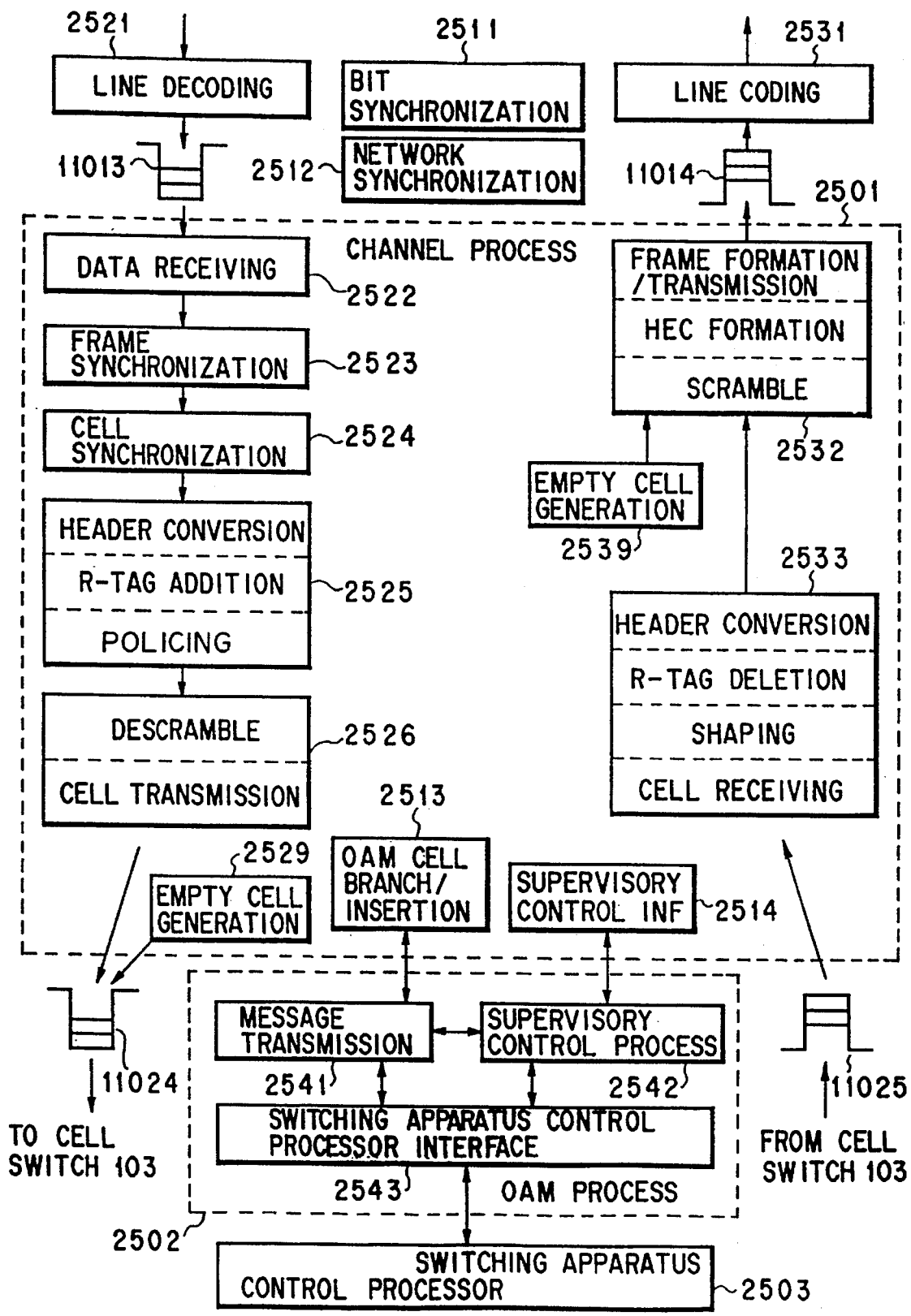
FIG. 25 is a flow chart showing another flow of process in a processor switching process package.

In the embodiment shown in FIG. 25, careful consideration must be given to descramble process of cells output to the cell switch 103. More specifically, a 2-byte operation variable obtained as a result of descramble process of a cell must be used for descramble process of the next cell. Referring to FIG. 25, a cell from an interface point and a cell from the OAM process are input together to the descramble subroutine. In this case, the descramble subroutine does not process the cell from the OAM process but needs to process the cell from the interface point by using the previous operation variable. For this reason, a flag indicating whether a given cell is a cell from an interface point may be set as an argument of the descramble subroutine.

Note that, in the scheme shown in FIG. 25, when an OAM cell input from an interface point is to be branched to the OAM process, the information portion must undergo the scramble subroutine once.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A switching apparatus comprising:

an input port to which information data associated with an ATM cell is input;

storage means for storing the information data input via said input port;

procedure information means for outputting procedure information indicating a procedure for sequentially performing frame synchronization process for finding each frame of the information data read out from said storage means and ATM cell synchronization process for checking a cell structure;

process means for sequentially performing the frame synchronization process and the cell synchronization process with respect to the information data read out from said storage means in accordance with the procedure information from said procedure information means; and an output port for outputting information data processed by said process means.

2. An apparatus according to claim 1, wherein said process means sequentially executes the frame synchronization process and the ATM cell synchronization process when a predetermined amount of information data is stored in said storage means.

3. An apparatus according to claim 2, wherein said output port includes output side storage means for temporarily storing information data after the frame synchronization process and the ATM cell synchronization process, and said process means stores information data of a predetermined pattern when information data stored in said output side storage means is smaller than a predetermined data amount.

4. An apparatus according to claim 1, wherein said input port is composed of an input FIFO for temporarily storing information data, and said process means executes said frame synchronizing process and said cell synchronization process when the amount of data stored in said input FIFO is larger than a predetermined amount of data.

5. An apparatus according to claim 4, wherein said apparatus temporarily writes the information data from said input FIFO into said storage means, and thereafter transfers a pointer for a data block to the process means for use by the frame synchronization process, the pointer being stored in the storage means and indicates a position at which the data block is stored.

6. An apparatus according to claim 1, wherein said procedure information means further outputs information indicating the procedure for counting the cells inputted from said input port and information indicating the procedure for measuring the cell arrival interval for each connection set for said input port, regarding the number of cells inputted as the elapsed time at said input port; and said process means further executes said counting of cells inputted and said measurement of cell arrival interval on the basis of the information from said procedure information means, soon after said frame synchronization process and cell synchronization process.

7. An apparatus according to claim 6, wherein said procedure information means further outputs information indicating the procedure for judging whether to transmit said inputted cells to said output port, on the basis of the cell arrival interval between the individual cells inputted from said input port and the information previously stored in said storage means; and said process means further executes the process of judging whether to transmit said inputted cells on the basis of the procedure information from said procedure information means, soon after said counting of cells inputted and said measurements of cell arrival interval.

8. An apparatus according to claim 1, wherein said procedure information means further outputs information indicating the procedure for monitoring the progress of said frame synchronization process and said cell synchronization process; and said process means executes said monitoring procedure according to the procedure information from said procedure information means, during the time when neither said frame synchronization process nor said cell synchronization process is being performed.

9. An apparatus according to claim 1, wherein said procedure information means further outputs information indicating an OAM cell extracting procedure for extracting OAM cells from the cells obtained from said cell synchronization process, an OAM cell diverging procedure for writing said extracted OAM cells into OAM cell storage means, and an OAM cell process procedure for processing said diverged OAM cells; and said process means sequentially executes said OAM cell extracting procedure, OAM cell diverging procedure, and OAM cell process procedure according to the procedure information from said procedure information means, during the time when neither said frame synchronization process nor said cell synchronization process is being performed, and said OAM cell storage means transfers a pointer for a data block to the process means for use by said OAM cell process procedure, the pointer being stored in said OAM cell storage means and indicates a position at which the data block is stored.

10. A switching apparatus comprising:

an input port having an input FIFO for receiving a bit string constituting information data associated with ATM cell and temporarily holding the bit string;

a processor for sequentially performing frame synchronization process of searching the bit string stored in said input FIFO for a bit pattern indicating a head of a frame by referring to said input FIFO, and checking whether the bit pattern indicating the head of the frame is present a frame length ahead of the frame, and cell synchronization process of finding a bit pattern indicating a head of a frame in the input bit string, and recognizing a head of a cell from the bit pattern and processing information data in units of cells when the bit pattern sequentially appears at intervals of the frame length; and an output port having an output FIFO for temporarily storing and outputting information indicating a destination of a cell stream formed by said processor.

11. An apparatus according to claim 10, wherein said processor sequentially executes said frame synchronization process and said ATM cell synchronization process, when a predetermined amount of data has been stored in said input FIFO.

12. An apparatus according to claim 11, wherein said processor inserts information data of a predetermined pattern in said output FIFO when information data stored in said output FIFO is smaller than a predetermined data amount.

13. A switching apparatus comprising:

an input port to which ATM cells are inputted;

storage means for storing said ATM cells inputted via said input port;

procedure information means for outputting information indicating the procedure for HEC operation and the mapping of said ATM cells onto a frame structure, to said ATM cells read from said storage means;

process means for performing said HEC operation and said ATM cell mapping onto a frame structure on the ATM cells stored in said storage means, on the basis of the procedure information from said procedure information means; and an output port for outputting the ATM cells mapped on a frame structure at said process means.

14. An apparatus according to claim 13, wherein said output port contains output-side storage means for temporarily storing the resulting information data after said HEC operation and said ATM cell mapping onto a frame structure; and said process means for mapping the ATM cells of a predetermined pattern onto a frame structure and storing the results in said output-side storage means, when the amount of information data stored in said output-side means is less than a predetermined amount of data.

15. A switching apparatus comprising:

an input port to which ATM cells with routing tags are inputted;

storage means for storing said ATM cells with routing tags inputted via said input port;

procedure information means for outputting procedure information indicating the procedure for routing tag deletion, HEC operation and ATM cell mapping onto a frame structure, to said ATM cells with routing tags read from said storage means;

process means for performing said routing tag deletion, said HEC operation, and said ATM cell mapping onto a frame structure on the ATM cells stored in said storage means, on the basis of the procedure information from said procedure information means; and an output port for outputting the ATM cells mapped on a frame structure at said process means.

16. An apparatus according to claim 15, wherein said input port comprises an input FIFO for temporarily storing information data associated with the ATM cells, and said process means sequentially executes said routing tag deletion, said HEC operation, and said ATM cell mapping onto a frame structure, when a predetermined amount of ATM cells with routing tags is stored in said storage means.

17. An apparatus according to claim 16, wherein said apparatus temporarily writes the ATM cells with routing tags from said input FIFO into said storage means, and thereafter transfers a pointer for a data block to the process means for use during the process of mapping ATM cells, the pointer being stored in said storage means and indicates a position at which the ATM cells are stored.

18. An apparatus according to claim 15, wherein said procedure information means further outputs information indicating an OAM cell extracting procedure for extracting OAM cells from the cells obtained as a result from deleting said routing tags, an OAM cell diverging procedure for writing said extracted OAM cells into OAM cell storage means, and an OAM cell process procedure for processing said diverged OAM cells; and said process means sequentially executes said OAM cell extracting procedure, OAM cell diverging procedure, and OAM cell process procedure according to the procedure information from said procedure information means during the time when neither said routing tag deletion nor said HEC operation nor said ATM cell mapping onto a frame structure is being performed, and transfers the pointer to said OAM cell storage means from said OAM cell diverging procedure to said OAM cell process procedure.

19. A switching apparatus comprising:

an input port containing an input FIFO for receiving ATM cells with routing tags and temporarily storing them;

a processor for referring to said input FIFO, deleting the routing tags from the ATM cells stored therein, creating a frame structure on its own, and then mapping said ATM cells from which said routing tags have been deleted, onto said created frame structure; and an output port containing an FIFO for temporarily storing the frame created by said processor and outputs the frame.

20. An apparatus according to claim 19, wherein said processor sequentially executes said routing tag deletion, said frame structure creation, and said ATM cell mapping onto a frame structure, when a predetermined amount of ATM cells is stored in said input FIFO.

21. An apparatus according to claim 19, wherein said processor maps the ATM cells of a predetermined pattern onto a frame and then inserts the results into said output FIFO, when the amount of information data stored in said output FIFO is less than a predetermined amount of data.

22. A switching apparatus comprising:

storage means for storing cell headers of ATM cells;

procedure information means for outputting procedure information indicating the procedure for inputting the cell headers from said storing means;

procedure information means for outputting procedure information indicating a process for inputting the cell headers from said storing means, information indicating a process for counting the cell headers inputted from said storing means, information indicating a process for measuring a cell arrival interval for each connection set for said storing means and regarding the number of cell headers inputted as an elapsed time, information indicating a process for judging whether or not the inputted cell headers are to be transmitted, and information indicating a process for rewriting the cell headers determined to be transmitted; and process means for sequentially performing the process of inputting the cell headers from said storing means, the process of counting the cell headers inputted from said storing means, the process of measuring the cell arrival interval for each connection set for said storing means regarding the number of cell headers inputted as the elapsed time, the process of judging whether or not the inputted cell headers are to be transmitted, and the process of rewriting the cell headers determined to be transmitted.

* * * * *